(12) United States Patent
Vogels et al.

(10) Patent No.: US 10,475,165 B2
(45) Date of Patent: Nov. 12, 2019

(54) KERNEL-PREDICTING CONVOLUTIONAL NEURAL NETWORKS FOR DENOISING

(71) Applicant: Disney Enterprises, Inc., Burbank, CA (US)

(72) Inventors: Thijs Vogels, Zürich (CH); Jan Novák, Meilen (CH); Fabrice Rousselle, Ostermundingen (CH); Brian McWilliams, Zürich (CH)

(73) Assignees: Disney Enterprises, Inc., Burbank, CA (US); ETH Zürich (Eidgenössische Technische Hochschule Zürich, Zürich (CH)

( * ) Notice: Subject to any disclaimer, the term of this patent is extended or adjusted under 35 U.S.C. 154(b) by 139 days.

(21) Appl. No.: 15/814,190

(22) Filed: Nov. 15, 2017

(65) Prior Publication Data

US 2018/0293711 A1    Oct. 11, 2018

Related U.S. Application Data

(60) Provisional application No. 62/482,593, filed on Apr. 6, 2017.

(51) Int. Cl.
  *G06T 5/00*  (2006.01)
  *G06F 17/10*  (2006.01)
  (Continued)

(52) U.S. Cl.
  CPC .............. *G06T 5/002* (2013.01); *G06F 17/10* (2013.01); *G06K 9/40* (2013.01); *G06K 9/6256* (2013.01);
  (Continued)

(58) Field of Classification Search
  None
  See application file for complete search history.

(56) References Cited

U.S. PATENT DOCUMENTS

| 7,747,070 B2 * | 6/2010 | Puri | G06K 9/4628 |
| | | | 382/157 |
| 9,008,391 B1 * | 4/2015 | Solanki | G16H 30/20 |
| | | | 382/128 |

(Continued)

OTHER PUBLICATIONS

Bako, S., Vogels, T., McWilliams, B., Meyer, M., Novák, J., Harvill, A., . . . & Rousselle, F. (2017). Kernel-predicting convolutional networks for denoising Monte Carlo renderings. ACM Trans. Graph., 36(4), 97-1. (Year: 2017).*

(Continued)

*Primary Examiner* — Andrae S Allison
(74) *Attorney, Agent, or Firm* — Kilpatrick Townsend & Stockton LLP

(57) ABSTRACT

Supervised machine learning using convolutional neural network (CNN) is applied to denoising images rendered by MC path tracing. The input image data may include pixel color and its variance, as well as a set of auxiliary buffers that encode scene information (e.g., surface normal, albedo, depth, and their corresponding variances). In some embodiments, a CNN directly predicts the final denoised pixel value as a highly non-linear combination of the input features. In some other embodiments, a kernel-prediction neural network uses a CNN to estimate the local weighting kernels, which are used to compute each denoised pixel from its neighbors. In some embodiments, the input image can be decomposed into diffuse and specular components. The diffuse and specular components are then independently preprocessed, filtered, and postprocessed, before recombining them to obtain a final denoised image.

21 Claims, 28 Drawing Sheets

(51) Int. Cl.
*G06K 9/62* (2006.01)
*G06N 3/08* (2006.01)
*G06K 9/40* (2006.01)
*G06N 3/04* (2006.01)

(52) U.S. Cl.
CPC ......... *G06K 9/6267* (2013.01); *G06N 3/0454* (2013.01); *G06N 3/08* (2013.01); *G06T 2207/20182* (2013.01)

(56) References Cited

U.S. PATENT DOCUMENTS

| | | | | |
|---|---|---|---|---|
| 9,324,022 | B2* | 4/2016 | Williams, Jr. | ....... G06N 3/0454 |
| 9,760,690 | B1* | 9/2017 | Petkov | ..................... G06T 15/08 |
| 2013/0335434 | A1* | 12/2013 | Wang | ................... G06T 15/506 |
| | | | | 345/581 |
| 2016/0321523 | A1* | 11/2016 | Sen | ......................... G06T 5/002 |
| 2017/0161891 | A1* | 6/2017 | Madabhushi | ......... G06T 7/0012 |
| 2017/0339394 | A1* | 11/2017 | Paulus, Jr. | ........... H04N 13/207 |
| 2018/0025257 | A1* | 1/2018 | van den Oord | ........ H04N 19/50 |
| | | | | 375/240.14 |
| 2018/0150728 | A1* | 5/2018 | Vandat | ................. G06K 9/6278 |
| 2018/0293713 | A1* | 10/2018 | Vogels | ................. G06N 3/0472 |

OTHER PUBLICATIONS

Liu, Zichen. "Machine Learning For Filtering Monte Carlo Noise In Ray Traced Images." (2017). (Year: 2017).*
Vogels, Thijs, et al. "Denoising with kernel prediction and asymmetric loss functions." ACM Transactions on Graphics (TOG) 37.4 (2018): 124. (Year: 2018).*
Chaitanya, Chakravarty R. Alla, et al. "Interactive reconstruction of Monte Carlo image sequences using a recurrent denoising autoencoder." ACM Transactions on Graphics (TOG) 36.4 (2017): 98. (Year: 2017).*
Kalantari, Nima Khademi, Steve Bako, and Pradeep Sen. "A machine learning approach for filtering Monte Carlo noise." ACM Trans. Graph. 34.4 (2015): 122-1. (Year: 2015).*

* cited by examiner

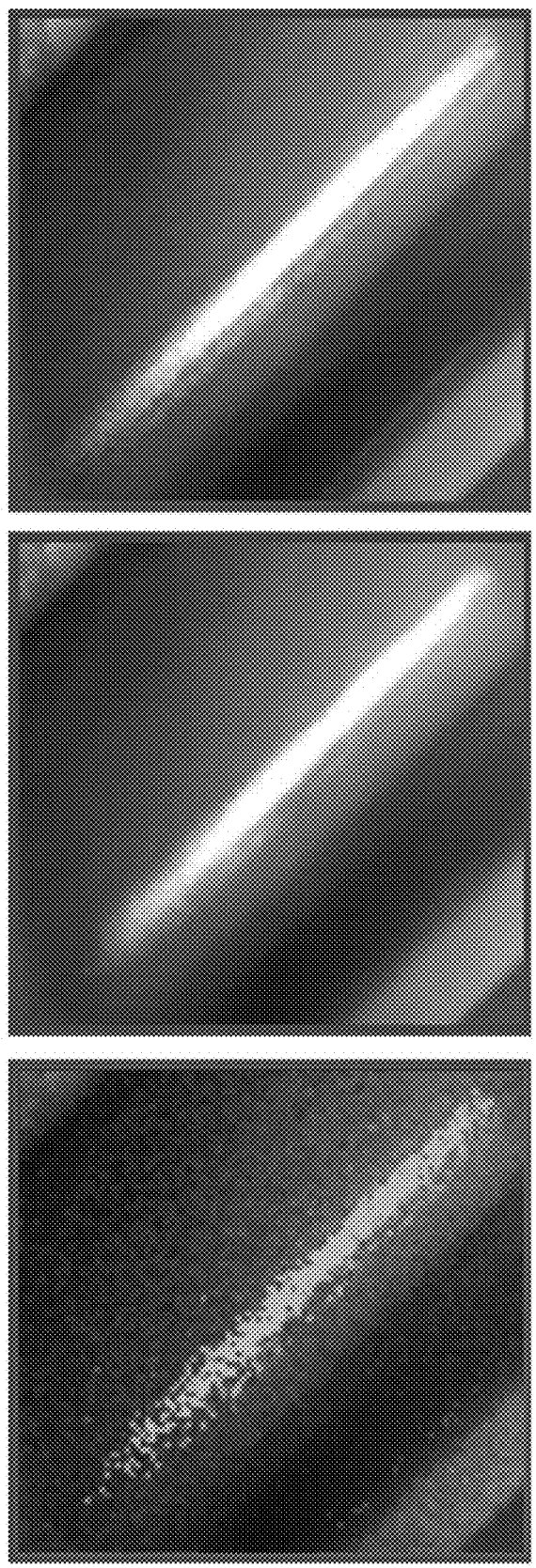

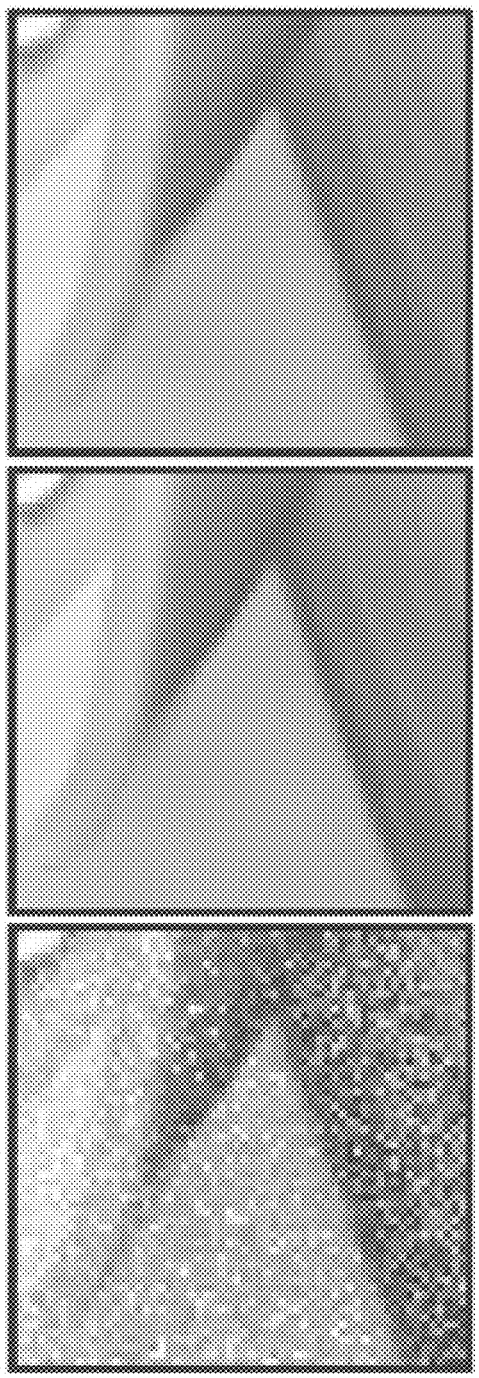
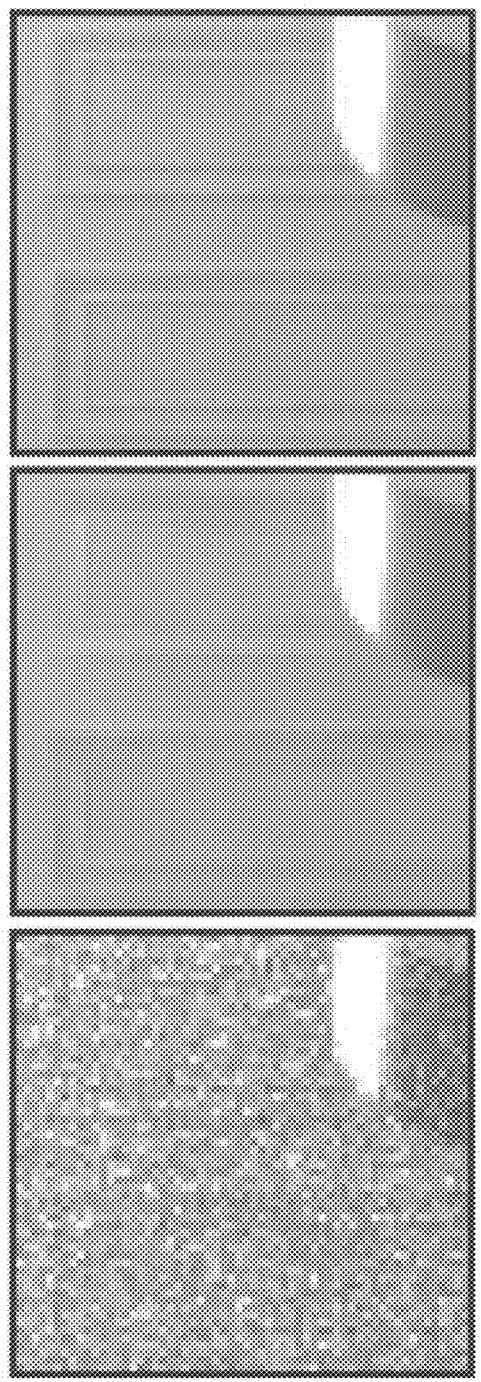
FIG. 18A  FIG. 18B  FIG. 18C  FIG. 18D  FIG. 18E  FIG. 18F

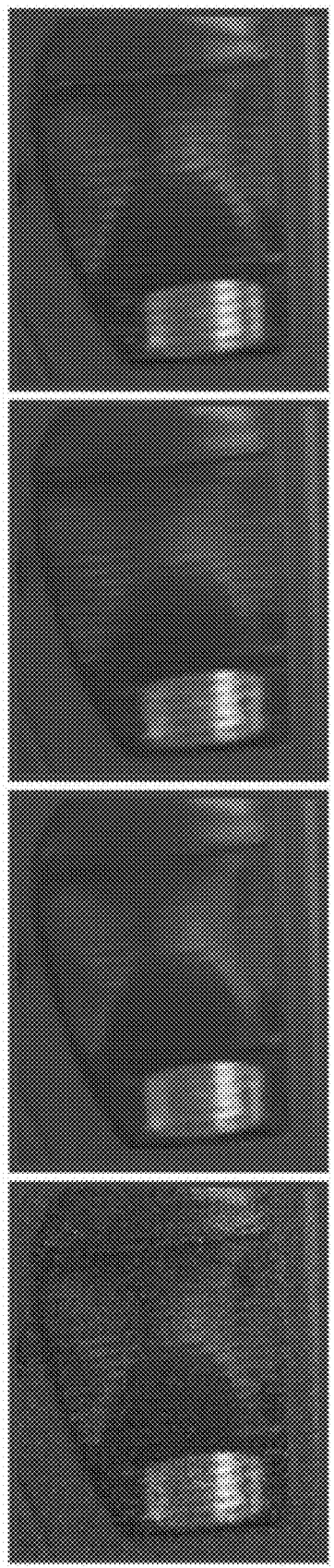

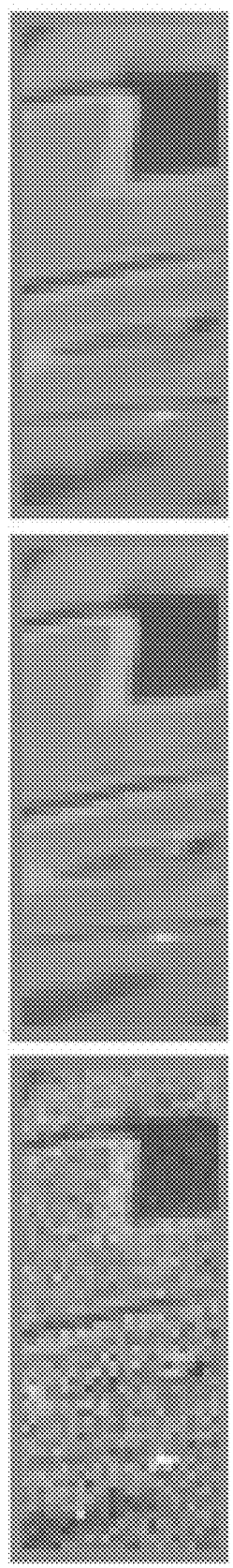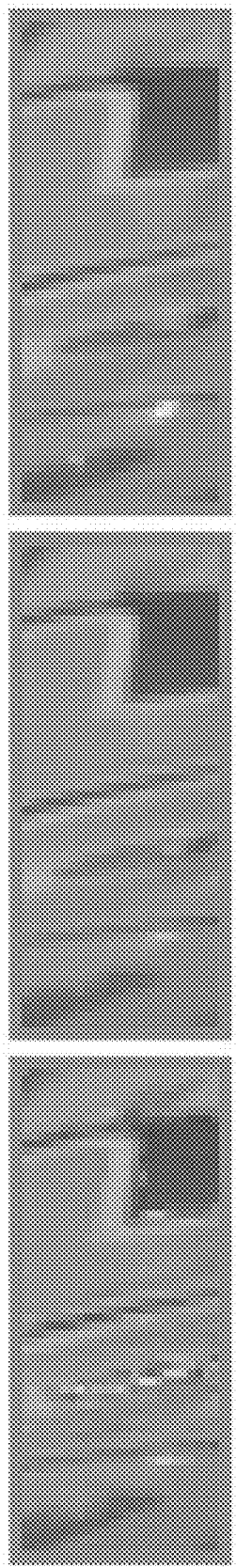
FIG. 25A  FIG. 25B  FIG. 25C  FIG. 25D  FIG. 25E  FIG. 25F

KERNEL-PREDICTING CONVOLUTIONAL NEURAL NETWORKS FOR DENOISING

CROSS-REFERENCES TO RELATED APPLICATIONS

This application claims the benefit of U.S. Provisional Patent Application No. 62/482,593, filed on Apr. 6, 2017, the content of which is incorporated by reference in its entirety.

BACKGROUND

Monte Carlo (MC) path tracing is a technique for rendering images of three-dimensional scenes by tracing paths of light through pixels on an image plane. This technique is capable of producing high quality images that are nearly indistinguishable from photographs. In MC path tracing, the color of a pixel is computed by randomly sampling light paths that connect the camera to light sources through multiple interactions with the scene. The mean intensity of many such samples constitutes a noisy estimate of the total illumination of the pixel. Unfortunately, in realistic scenes with complex light transport, these samples might have large variance, and the variance of their mean only decreases linearly with respect to the number of samples per pixel. Typically, thousands of samples per pixel are required to achieve a visually converged rendering. This can result in prohibitively long rendering times. Therefore, there is a need to reduce the number of samples needed for MC path tracing while still producing high-quality images.

SUMMARY

Supervised machine learning using convolutional neural networks (CNNs) is applied to denoising images rendered by MC path tracing. The input image data may include pixel color and its variance, as well as a set of auxiliary buffers that encode scene information (e.g., surface normal, albedo, depth, and their corresponding variances). A repeated-block architecture and a residual-block architecture may be employed in the neural networks. In some embodiments, a CNN directly predicts the final denoised pixel value as a highly non-linear combination of the input features. In some other embodiments, a kernel-prediction neural network uses a CNN to estimate the local weighting kernels, which are used to compute each denoised pixel from its neighbors. In some embodiments, the input image can be decomposed into diffuse and specular components. The diffuse and specular components are then independently preprocessed, filtered, and postprocessed, before recombining them to obtain a final denoised image. A normalization procedure may be used as a preprocessing step in order to mitigate the high-dynamic range of the input images rendered by MC path tracing.

BRIEF DESCRIPTION OF THE DRAWINGS

FIG. 17A shows yet another exemplary input image rendered with 32 spp; FIG. 17B shows a corresponding denoised image according to some embodiments of the present invention; and FIG. 17C shows a corresponding reference image rendered with about 1-4 thousands ssp.

FIGS. 18A-18C show an input image rendered with Tungsten (128 spp), a corresponding denoised image, and a reference image (rendered with 32K spp), respectively, for an exemplary scene according to some embodiments of the present invention.

FIGS. 18D-18F show an input image rendered with Tungsten (128 spp), a corresponding denoised image, and a reference image (rendered with 32K spp), respectively, for another exemplary scene according to some embodiments of the present invention.

FIGS. 23A-23D show an input image (rendered with 32 spp), a corresponding output image denoised without using additional features, a corresponding output image denoised using additional features (e.g., shading normal, depth, albedo), and a reference image (rendered with 2K spp), respectively, for another exemplary scene according to some embodiments of the present invention.

FIGS. 25A-25F show (A) an input image (rendered with 32 spp), (B) a corresponding output image denoised without decomposition of the input and albedo divide, (C) a corresponding output image denoised with decomposition of the input but without albedo divide, (D) a corresponding output image denoised without decomposition of the input but with albedo divide, (E) a corresponding output image denoised with decomposition of the input and albedo divide, and (F) a reference image (rendered with 2K spp), respectively, for another exemplary scene according to some embodiments of the present invention.

DETAILED DESCRIPTION

Figure 1:
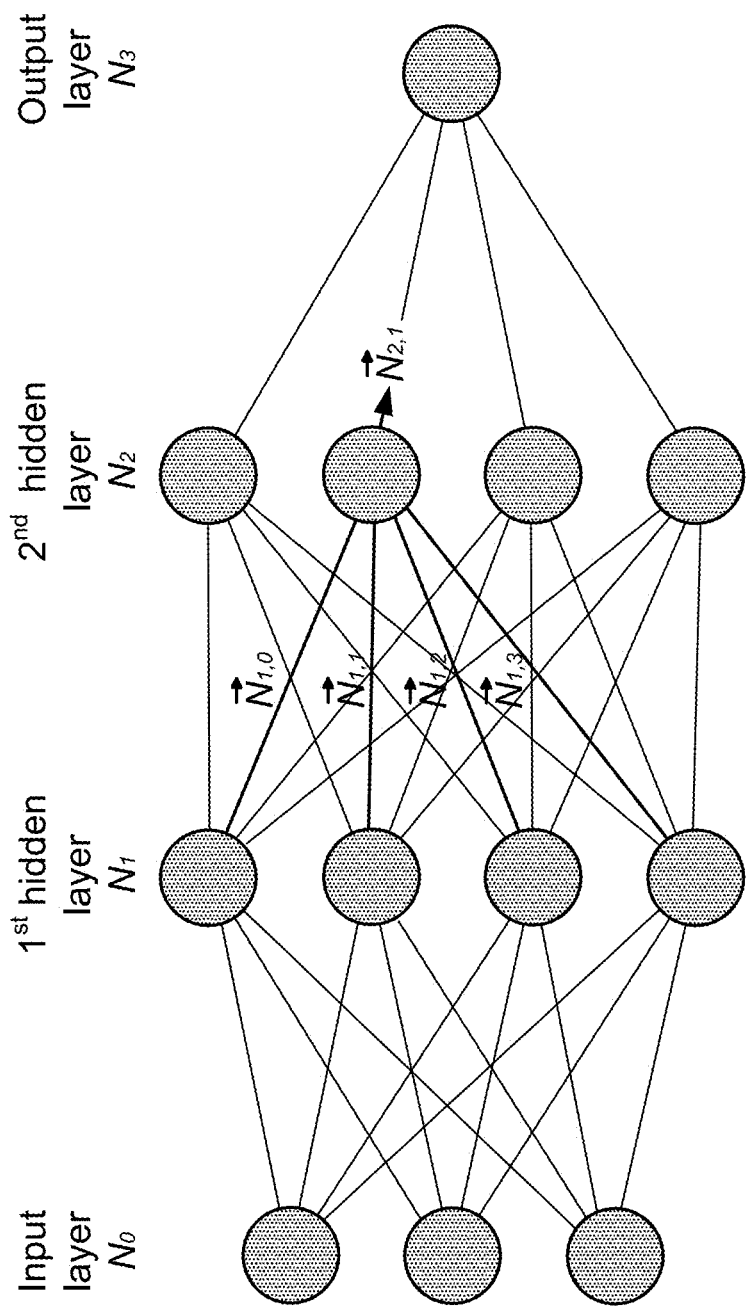
FIG. 1 illustrates an exemplary neural network according to some embodiments.

In recent years, physically-based image synthesis has become widespread in feature animation and visual effects. Fueled by the desire to produce photorealistic imagery, many production studios have switched their rendering algorithms from REYES-style micropolygon architectures to physically-based Monte Carlo (MC) path tracing. While MC rendering algorithms can satisfy high quality requirements, they do so at a significant computational cost and with convergence characteristics that require long rendering times for nearly noise-free images, especially for scenes with complex light transport.

Recent postprocess, image-space, general MC denoising algorithms have demonstrated that it is possible to achieve high-quality results at considerably reduced sampling rates (see Zwicker et al. and Sen et al. for an overview), and commercial renderers are now incorporating these techniques. For example, Chaos group's VRay renderer, the Corona renderer, and Pixar's RenderMan now ship with integrated denoisers. Moreover, many production houses are developing their own internal solutions or using third-party tools (e.g., the Altus denoiser). Most existing image-space MC denoising approaches use a regression framework.

Some improvements in image-space MC denoising techniques have been achieved due to more robust distance metrics, higher order regression models, and diverse auxiliary buffers tailored to specific light transport components. These advances, however, have come at the cost of ever-increasing complexity, while offering progressively diminishing returns. This is partially because higher-order regression models are prone to overfitting to the noisy input. To circumvent the noise-fitting problem, Kalantari et al. recently proposed an MC denoiser based on supervised learning that is trained with a set of examples of noisy inputs and the corresponding reference outputs. However, this approach used a relatively simple multi-layer perceptron (MLP) for the learning model and was trained on a small number of scenes. Moreover, their approach hardcoded the filter to either be a joint bilateral or joint non-local means, which limited the flexibility of their system.

Embodiments of the present invention provide a novel supervised learning framework that allows for more complex and general filtering kernels by leveraging deep convolutional neural networks (CNNs). Ever-increasing amount of production data can offer a large and diverse dataset for training a deep CNN to learn the complex mapping between a large collection of noisy inputs and corresponding references. One advantage is that CNNs are able to learn powerful non-linear models for such a mapping by leveraging information from the entire set of training images, not just a single input as in many of the previous approaches. Moreover, once trained, CNNs are fast to evaluate and do not require manual tuning or parameter tweaking. Also, such a system can more robustly cope with noisy renderings to generate high-quality results on a variety of MC effects without overfitting. Although this approach could be used for other applications of physically-based image synthesis, the present disclosure focuses on high-quality denoising of static images for production environments.

More specifically, embodiments of the present invention provide a deep learning solution for denoising MC renderings which is trained and evaluated on actual production data. It has been demonstrated that this approach performs on par or better than existing state-of-the-art denoising methods. Inspired by the standard approach of estimating a pixel value as a weighted average of its noisy neighborhood, embodiments of the present invention use a novel kernel-prediction CNN architecture that computes the locally optimal neighborhood weights. This provides regularization for a better training convergence rate and facilitates use in production environments. Embodiments of the present invention also explore and analyze the various processing and design decisions, including a two-network framework for denoising diffuse and specular components of the image separately, and a normalization procedure for the input image data that significantly improves the denoising performance for images with high dynamic range.

I. RENDERING USING MONTE CARLO PATH TRACING

Path tracing is a technique for presenting computer-generated scenes on a two-dimensional display by tracing a path of a ray through pixels on an image plane. The technique can produce high-quality images, but at a greater computational cost. In some examples, the technique can include tracing a set of rays to a pixel in an image. The pixel can be set to a color value based on the one or more rays. In such examples, a set of one or more rays can be traced to each pixel in the image. However, as the number of pixels in an image increases, the computational cost also increases.

In a simple example, when a ray reaches a surface in a computer-generated scene, the ray can separate into one or more additional rays (e.g., reflected, refracted, and shadow rays). For example, with a perfectly specular surface, a reflected ray can be traced in a mirror-reflection direction from a point corresponding to where an incoming ray reaches the surface. The closest object that the reflected ray intersects can be what will be seen in the reflection. As another example, a refracted ray can be traced in a different direction than the reflected ray (e.g., the refracted ray can go into a surface). For another example, a shadow ray can be traced toward each light. If any opaque object is found between the surface and the light, the surface can be in shadow and the light may not illuminate the surface. However, as the number of additional rays increases, the computational costs for path tracing increases even further. While a few types of rays have been described that affect computational cost of path tracing, it should be recognized that there can be many other variables that affect computational cost of determining a color of a pixel based on path tracing.

In some examples, rather than randomly determining which rays to use, a bidirectional reflectance distribution function (BRDF) lobe can be used to determine how light is reflected off a surface. In such examples, when a material is more diffuse and less specular, the BRDF lobe can be wider, indicating more directions to sample. When more sampling directions are required, the computation cost for path tracing may increase.

In path tracing, the light leaving an object in a certain direction is computed by integrating all incoming and generated light at that point. The nature of this computation is recursive, and is governed by the rendering equation:

$$L_o(\vec{x}, \vec{\omega}_o) = L_e(\vec{x}, \vec{\omega}_o) + \int_\Omega f_r(\vec{x}, \vec{\omega}_i, \vec{\omega}_o) L_i(\vec{x}, \vec{\omega}_i)(\vec{\omega}_i \cdot \vec{n}) d\vec{\omega}_i, \quad (1)$$

where $L_o$ represents the total radiant power transmitted from an infinitesimal region around a point $\vec{x}$ into an infinitesimal cone in the direction $\vec{\omega}_o$. This quantity may be referred to as "radiance." In equation (1), $L_e$ is the emitted radiance (for light sources), $\vec{n}$ is the normal direction at position $\vec{x}$, $\Omega$ is the unit hemisphere centered around $\vec{n}$ containing all possible values for incoming directions $\vec{\omega}_i$, and $L_i$ represents the incoming radiance from $\vec{\omega}_i$. The function $f_r$ is referred to as the bidirectional reflectance distribution function (BRDF). It captures the material properties of an object at $\vec{x}$.

The recursive integrals in the rendering equation are usually evaluated using a MC approximation. To compute the pixel's color, light paths are randomly sampled throughout the different bounces. The MC estimate of the color of a pixel i may be denoted as the mean of n independent samples $p_{i,k}$ from the pixel's sample distribution $\mathbb{S}_i$ as follows, $$\bar{p}_i = \frac{1}{n} \sum_{k=1}^{n} p_{i,k}, \ p_{i,k} \sim \mathbb{S}_i \ \forall \ i \in [1, n], \quad (2)$$

The MC approximated $\vec{p}_i$ is an unbiased estimate for the converged pixel color mean $\tilde{p}_i$ that would be achieved with an infinite number of samples:

$$\tilde{p}_i = \lim_{n \to \infty} \frac{1}{n} \sum_{k=1}^{n} p_{i,k}. \quad (3)$$

In unbiased path tracing, the mean of $\mathbb{S}_i$ equals $\tilde{p}_i$, and its variance depends on several factors. One cause might be that light rays sometimes just hit an object, and sometimes just miss it, or that they sometimes hit a light source, and sometimes not. This makes scenes with indirect lighting and many reflective objects particularly difficult to render. In these cases, the sample distribution is very skewed, and the samples $p_{i,k}$ can be orders of magnitude apart.

The variance of the MC estimate $\bar{p}_i$ based on n samples, follows from the variance of $\mathbb{S}_i$ as $$\mathrm{Var}[\bar{p}_i] = \frac{1}{n} \mathrm{Var}[\mathbb{S}_i]. \quad (4)$$

Because the variance decreases linearly with respect to n, the expected error $\sqrt{\mathrm{Var}[\bar{p}_i]}$ decreases as $1/\sqrt{n}$.

II. IMAGE-SPACE MONTE CARLO DENOISING

To deal with the slow convergence of MC renderings, several denoising techniques have been proposed to reduce the variance of rendered pixel colors by leveraging spatial redundancy in images. Denoising algorithms may be classified into a priori methods and a posteriori methods. The difference between the two categories is that a priori methods make use of analytical models based on intricate knowledge of the 3D scene, such as analytical material descriptions and geometry descriptions. A posteriori denoisers, on the other hand, operate from per-pixel statistics such as the mean and variance of the sample colors and possibly statistics of guiding features recorded during rendering, such as normal directions, texture information, direct visibility, and camera depth. The aim for both kinds of denoising approaches is to estimate the ground truth pixel colors achieved when the number of samples goes to infinity. Embodiments of the present invention use a posteriori denoising techniques.

Most existing a posteriori denoisers estimate $\hat{p}_i$ by a weighted sum of the observed pixels $\bar{p}_k$ in a region of pixels around pixel i:

$$\hat{p}_i = \sum_{k \in \mathcal{R}_i} \bar{p}_k w(i,k), \quad (5)$$

where $\mathcal{R}_i$ is a region (e.g. a square region) around pixel i and $\sum_{k \in \mathcal{R}_i} w(i, k)=1$. The weights w(i, k) follow from different kinds of weighted regressions on $\mathcal{R}_i$.

Most existing denoising methods build on the idea of using generic non-linear image-space filters and auxiliary feature buffers as a guide to improve the robustness of the filtering process. One important development was to leverage noisy auxiliary buffers in a joint bilateral filtering scheme, where the bandwidths of the various auxiliary features are derived from the sample statistics. One application of these ideas was to use the non-local means filter in a joint filtering scheme. The appeal of the non-local means filter for denoising MC renderings is largely due to its versatility.

Recently, it was shown that joint filtering methods, such as those discussed above, can be interpreted as linear regressions using a zero-order model, and that more generally most state-of-the-art MC denoising techniques are based on a linear regression using a zero- or first-order model. Methods leveraging a first-order model have proved to be very useful for MC denoising, and while higher-order models have also been explored, it must be done carefully to prevent overfitting to the input noise.

Embodiments of the present invention use machine learning instead of a fixed filter, which has been shown to perform on par with state-of-the-art image filters. The deep CNN according to embodiments of the present invention can offer powerful non-linear mappings without overfitting, by learning the complex relationship between noisy and reference data across a large training set. The methods implicitly learn the filter itself and therefore can produce better results.

III. MACHINE LEARNING AND NEURAL NETWORKS

A. Machine Learning

In supervised machine learning, the aim may be to create models that accurately predict the value of a response variable as a function of explanatory variables. Such a relationship is typically modeled by a function that estimates the response variable y as a function $\hat{y}=f(\vec{x}, \vec{w})$ of the explanatory variables $\vec{x}$ and tunable parameters $\vec{w}$ that are adjusted to make the model describe the relationship accurately. The parameters $\vec{w}$ are learned from data. They are set to minimize a cost function, or loss, $L(\mathcal{D}_{train}, \vec{w})$ over a training set $\mathcal{D}_{train}$, which is typically the sum of errors on the entries of the dataset:

$$L(\mathcal{D}_{train}, \vec{w}) = \frac{1}{|\mathcal{D}_{train}|} \sum_{(\vec{x}_i, \tilde{y}_i) \in \mathcal{D}_{train}} l(\tilde{y}_i, f(\vec{x}_i, \vec{w})), \quad (6)$$

where l is a per-element loss function. The optimal parameters may satisfy $$\vec{w} = \underset{\vec{w}}{\operatorname{argmin}} L(\mathcal{D}_{train}, \vec{w}). \quad (7)$$

Typical loss functions for continuous variables are the quadratic or $L_2$ loss $l_2(y, \hat{y})=(y-\hat{y})^2$ and the $L_1$ loss $l_1(y, \hat{y})=|y-\hat{y}|$.

Common issues in machine learning may include overfitting and underfitting. In overfitting, a statistical model describes random error or noise in the training set instead of the underlying relationship. Overfitting occurs when a model is excessively complex, such as having too many parameters relative to the number of observations. A model that has been overfit has poor predictive performance, as it overreacts to minor fluctuations in the training data. Underfitting occurs when a statistical model or machine learning algorithm cannot capture the underlying trend of the data. Underfitting would occur, for example, when fitting a linear model to non-linear data. Such a model may have poor predictive performance.

To control over-fitting, the data in a machine learning problem may be split into three disjoint subsets: the training set $\mathcal{D}_{train}$, a test set $\mathcal{D}_{test}$, and a validation set $\mathcal{D}_{val}$. After a model is optimized to fit $\mathcal{D}_{train}$, its generalization behavior can be evaluated by its loss on $\mathcal{D}_{test}$. After the best model is selected based on its performance on $\mathcal{D}_{test}$, it is ideally re-evaluated on a fresh set of data $\mathcal{D}_{val}$.

B. Neural Networks

Neural networks are a general class of models with potentially large numbers of parameters that have shown to be very useful in capturing patterns in complex data. The model function f of a neural network is composed of atomic building blocks called "neurons" or nodes. A neuron $n_i$ has inputs $\vec{x}_i$ and an scalar output value $y_i$, and it computes the output as $$y_i = n_i(\vec{x}_i, \vec{w}_i) = \phi_i(\vec{x}_i \cdot \vec{w}_i), \quad (8)$$

where $\vec{w}_i$ are the neuron's parameters and $\vec{x}_i$ is augmented with a constant feature. $\phi$ is a non-linear activation function that is important to make sure a composition of several neurons can be non-linear. Activation functions can include hyperbolic tangent tan h(x), sigmoid function $\phi_{sigmoid}(x)=(1+\exp(-x))^{-1}$, and the rectified linear unit (ReLU) $\phi_{ReLU}(x)=\max(x, 0)$.

A neural network is composed of layers of neurons. The input layer $N_0$ contains the model's input data $\vec{x}$, and the neurons in the output layer predict an output $\hat{\vec{y}}$. In a fully connected layer $N_k$, the inputs of a neuron are the outputs of all neurons in the previous layer $N_{k-1}$.

FIG. 1 illustrates an exemplary neural network, in which neurons are organized into layers. $\vec{N}_k$ denotes a vector containing the outputs of all neurons $n_i$ in a layer k>0. The input layer $\vec{N}_0$ contains the model's input features x. The neurons in the output layer return the model prediction $\hat{\vec{y}}$. The outputs of the neurons in each layer k form the input of layer k+1.

The activity of a layer $N_i$ of a fully-connected feed forward neural network can be conveniently written in matrix notation:

$$\vec{N}_0 = \vec{x}, \quad (9)$$

$$\vec{N}_k = \phi_k(W_k \vec{N}_{k-1}) \forall k \in [1, n), \quad (10)$$

where $W_k$ is a matrix that contains the model parameters $\vec{w}_j$ for each neuron in the layer as rows. The activation function $\phi_k$ operates element wise on its vector input.

1. Multilayer Perception Neural Networks

There are different ways in which information can be processed by a node, and different ways of connecting the nodes to one another. Different neural network structures, such as multilayer perceptron (MLP) and convolutional neural network (CNN), can be constructed by using different processing elements and/or connecting the processing elements in different manners.

FIG. 1 illustrates an example of a multilayer perceptron (MLP). As described above generally for neural networks, the MLP can include an input layer, one or more hidden layers, and an output layer. In some examples, adjacent layers in the MLP can be fully connected to one another. For example, each node in a first layer can be connected to each node in a second layer when the second layer is adjacent to the first layer. The MLP can be a feedforward neural network, meaning that data moves from the input layer to the one or more hidden layers to the output layer when receiving new data.

The input layer can include one or more input nodes. The one or more input nodes can each receive data from a source that is remote from the MLP. In some examples, each input node of the one or more input nodes can correspond to a value for a feature of a pixel. Exemplary features can include a color value of the pixel, a shading normal of the pixel, a depth of the pixel, an albedo of the pixel, or the like. In such examples, if an image is 10 pixels by 10 pixels, the MLP can include 100 input nodes multiplied be the number of features. For example, if the features include color values (e.g., red, green, and blue) and shading normal (e.g., x, y, and z), the MLP can include 600 input nodes (10×10×(3+3)).

A first hidden layer of the one or more hidden layers can receive data from the input layer. In particular, each hidden node of the first hidden layer can receive data from each node of the input layer (sometimes referred to as being fully connected). The data from each node of the input layer can be weighted based on a learned weight. In some examples, each hidden layer can be fully connected to another hidden layer, meaning that output data from each hidden node of a hidden layer can be input to each hidden node of a subsequent hidden layer. In such examples, the output data from each hidden node of the hidden layer can be weighted based on a learned weight. In some examples, each learned weight of the MLP can be learned independently, such that a first learned weight is not merely a duplicate of a second learned weight.

A number of nodes in a first hidden layer can be different than a number of nodes in a second hidden layer. A number of nodes in a hidden layer can also be different than a number of nodes in the input layer (e.g., as in the neural network illustrated in FIG. 1).

A final hidden layer of the one or more hidden layers can be fully connected to the output layer. In such examples, the final hidden layer can be the first hidden layer or another hidden layer. The output layer can include one or more output nodes. An output node can perform one or more operations described above (e.g., non-linear operations) on data provided to the output node to produce a result to be provided to a system remote from the MLP.

2. Convolutional Neural Networks

In a fully connected layer, the number of parameters that connect the layer with the previous one is the product of the number of neurons in the layers. When a color image of size w×h×3 is the input of such a layer, and the layer has a similar number of output-neurons, the number of parameters can quickly explode and become infeasible as the size of the image increases.

Figure 2:
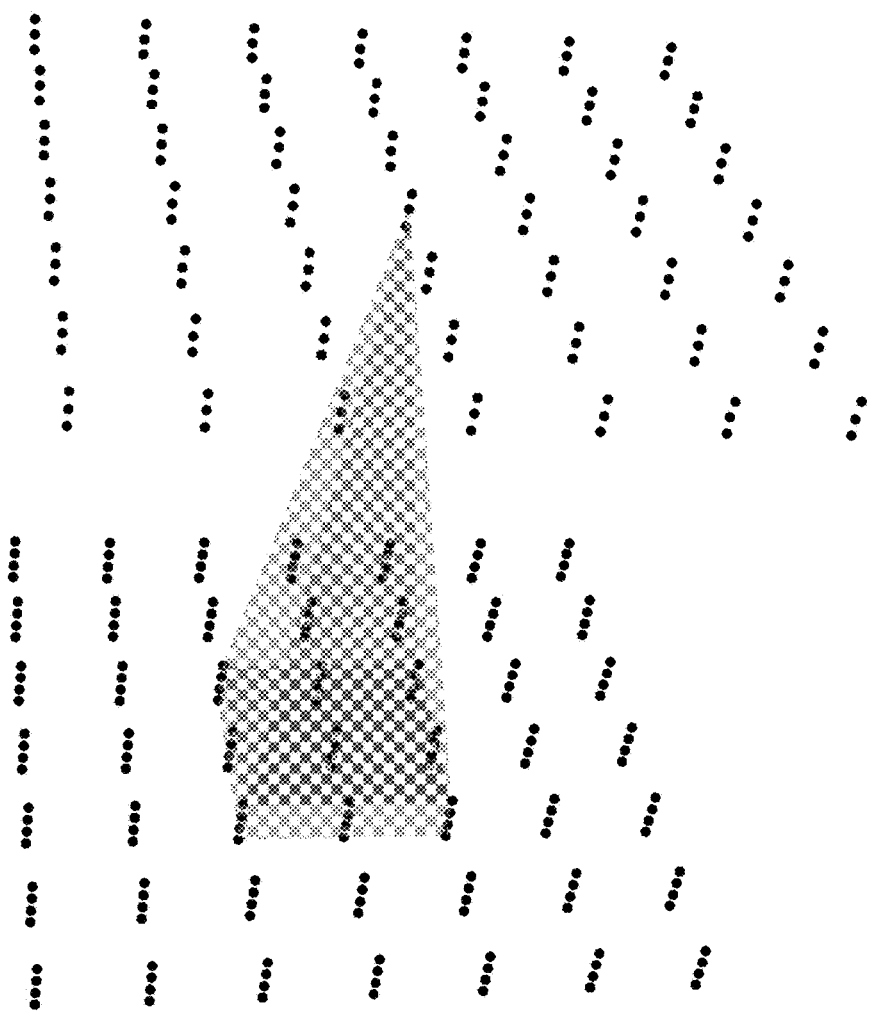
FIG. 2 illustrates an exemplary convolutional network (CNN) according to some embodiments.

To make neural networks for image processing more tractable, convolutional networks (CNNs) simplify the fully connected layer by making the connectivity of neurons between two adjacent layers sparse. FIG. 2 illustrates an exemplary CNN layer where neurons are conceptually arranged into a three-dimensional structure. The first two dimensions follow the spatial dimensions of an image, and the third dimension contains a number of neurons (may be referred to as features or channels) at each pixel location. The connectivity of the nodes in this structure is local. Each of a layer's output neurons is connected to all input neurons in a spatial region centered around it. The size of this region, $k_x \times k_y$, is referred to as the kernel size. The network parameters used in these regions are shared over the spatial dimensions, bringing the number of free parameters down to $d_{in} \times k_x \times k_y \times d_{out}$, where $d_{in}$ and $d_{out}$ are the number of features per pixel in the previous layer and the current layer respectively. The number $d_{out}$ is referred to as the number of channels or features in the layer.

In recent years, CNNs have emerged as a popular model in machine learning. It has been demonstrated that CNNS can achieve state-of-the-art performance in a diverse range of tasks such as image classification, speech processing, and many others. CNNs have also been used a great deal for a variety of low-level, image-processing tasks. In particular, several works have considered the problem of natural image denoising and the related problem of image super-resolution. However, a simple application of a convolutional network to MC denoising may expose a wide range of issues. For example, training a network to compute a denoised color from only a raw, noisy color buffer may cause overblurring, since the network cannot distinguish between scene noise and scene detail. Moreover, since the rendered images have high dynamic range, direct training may cause unstable weights (e.g., extremely large or small values) that can cause bright ringing and color artifacts in the final image.

By preprocessing features as well as exploiting the diffuse/specular decomposition, denoising methods according to embodiments of the present invention can preserve important detail while denoising the image. In addition, some embodiments of the present invention use a novel kernel prediction architecture to keep training efficient and stable.

IV. DENOISING USING NEURAL NETWORKS

According to some embodiments of the present invention, techniques based on machine learning, and more particularly based on convolutional neural networks, are used to denoise Monte Carlo path-tracing renderings. The techniques disclosed herein may use the same inputs used in conventional denoising techniques based on linear regression or zero-order and higher-order regressions. The inputs may include, for example, pixel color and its variance, as well as a set of auxiliary buffers (and their corresponding variances) that encode scene information (e.g., surface normal, albedo, depth, and the like).

A. Modeling Framework

Before introducing the denoising framework, some mathematical notations may be defined as follows. The samples output by a typical MC renderer can be averaged down into a vector of per-pixel data, $$x_p = \{c_p, f_p\}, \text{ where } x_p \in \mathbb{R}^{3+D}, \quad (11)$$

where, $c_p$ represents the red, green and blue (RGB) color channels, and $f_p$ is a set of D auxiliary features (e.g., the variance of the color feature, surface normals, depth, albedo, and their corresponding variances).

The goal of MC denoising may be defined as obtaining a filtered estimate of the RGB color channels $\hat{c}_p$ for each pixel p that is as close as possible to a ground truth result $\bar{c}_p$ that would be obtained as the number of samples goes to infinity. The estimate of $\hat{c}_p$ may be computed by operating on a block $X_p$ of per-pixel vectors around the neighborhood $\mathcal{N}(p)$ to produce the filtered output at pixel p. Given a denoising function $g(X_p; \theta)$ with parameters $\theta$ (which may be referred to as weights), the ideal denoising parameters at every pixel can be written as:

$$\hat{\theta}_p = \text{argmin}_\theta l(\bar{c}_p, g(X_p; \theta)), \quad (12)$$

where the denoised value is $\hat{c}_p = g(X_p; \hat{\theta}_p)$, and $l(\bar{c}, \hat{c})$ is a loss function between the ground truth values $\bar{c}$ and the denoised values $\hat{c}$.

Since ground truth values $\bar{c}$ are usually not available at run time, an MC denoising algorithm may estimate the denoised color at a pixel by replacing $g(X_p; \theta)$ with $\theta^T \phi(x_q)$, where function $\phi: \mathbb{R}^{3+D} \to \mathbb{R}^M$ is a (possibly non-linear) feature transformation with parameters $\theta$. A weighted least-squares regression on the color values, $c_q$, around the neighborhood, $q \in \mathcal{N}(p)$, may be solved as:

$$\hat{\theta}_p = \text{argmin}_\theta \Sigma_{q \in \mathcal{N}(p)} (c_q - \theta^T \phi(x_q))^2 \omega(x_p, x_q), \quad (13)$$

where $\omega(x_p, x_q)$ is the regression kernel. The final denoised pixel value may be computed as $\hat{c}_p = \hat{\theta}_p^T \phi(x_p)$. The regression kernel $\omega(x_p, x_q)$ may help to ignore values that are corrupted by noise, for example by changing the feature bandwidths in a joint bilateral filter. Note that $\omega$ could potentially also operate on patches, rather than single pixels, as in the case of a joint non-local means filter.

As discussed above, some of the existing denoising methods can be classified as zero-order methods with $\phi_0(x_q)=1$, first-order methods with $\phi_1(x_q)=[1; x_q]$, or higher-order methods where $\phi_m(x_q)$ enumerates all the polynomial terms of $x_q$ up to degree m (see Bitterli et al. for a detailed discussion). The limitations of these MC denoising approaches can be understood in terms of bias-variance tradeoff. Zero-order methods are equivalent to using an explicit function such as a joint bilateral or non-local means filter. These represent a restrictive class of functions that trade reduction in variance for a high modeling bias. Although a well-chosen weighting kernel, $\omega$, can yield good performance, such approaches are fundamentally limited by their explicit filters. MC denosing methods according to embodiments of the present invention may remove these limitations by making the filter kernel more flexible and powerful.

Using a first- or higher-order regression may increase the complexity of the function, and may be prone to overfitting as $\hat{\theta}_p$ is estimated locally using only a single image and can easily fit to the noise. To address this problem, Kalantari et al. proposed to take a supervised machine learning approach to estimate g using a dataset $\mathcal{D}$ of N example pairs of noisy image patches and their corresponding reference color information, $\mathcal{D} = \{(X_1, \bar{c}_1), \ldots, (X_N, \bar{c}_N)\}$, where $\bar{c}_i$ corresponds to the reference color at the center of patch $X_i$ located at pixel i of one of the many input images. Here, the goal is to find parameters of the denoising function, g, that minimize the average loss with respect to the reference values across all the patches in $\mathcal{D}$:

$$\hat{\theta} = \text{argmin}_\theta \frac{1}{N} \sum_{i=1}^{N} l(\bar{c}_i, g(X_i; \theta)). \quad (14)$$

In this case, the parameters, $\theta$, are optimized with respect to all the reference examples, not the noisy information as in Eq. (13). If $\hat{\theta}$ is estimated on a large and representative training data set, then it can adapt to a wide variety of noise and scene characteristics.

However, the approach of Kalantari et al. has several limitations, the most important of which is that the function $g(X_i; \theta)$ was hardcoded to be either a joint bilateral or joint non-local means filter with bandwidths provided by a multi-layer perceptron (MLP) with trained weights $\theta$. Because the filter was fixed, the resulting system lacked the flexibility to handle the wide range of Monte Carlo noise that can be encountered in production environments.

To address this limitation, embodiments of the present invention extend the supervised machine learning approach to handle significantly more complex functions for g, which results in more flexibility while still avoiding overfitting. Such methods can reduce modeling bias while simultaneously ensuring the variance of the estimator is kept under control for a suitably large N. This can enable the resulting denoiser to generalize well to images not used during training.

There are three challenges inherent to a supervised machine learning framework that may be considered for developing a better MC denoising system. First, it may be desirable that the function, g, is flexible enough to capture the complex relationship between input data and reference colors for a wide range of scenarios. Second, the choice of loss function, l, can be important. Ideally, the loss should capture perceptually important differences between the estimated and reference color. However, it should also be easy to evaluate and optimize. Third, in order to avoid overfitting, it may be desirable to have a large training dataset $\mathcal{D}$. For models using reference images rendered at high sample counts, obtaining a large training dataset can be computationally expensive. Furthermore, in order to generalize well, the models may need examples that are representative of the various effects that can lead to particular noise-patterns to be identified and removed.

B. Deep Convolutional Denoising

Embodiments of the present invention model the denoising function g in Eq. (14) with a deep convolutional neural network (CNN). Since each layer of a CNN applies multiple spatial kernels with learnable weights that are shared over the entire image space, they are naturally suited for the denoising task and have been previously used for natural image denoising. In addition, by joining many such layers together with activation functions, CNNs may be able to learn highly nonlinear functions of the input features, which can be advantageous for obtaining high-quality outputs.

Figure 3:
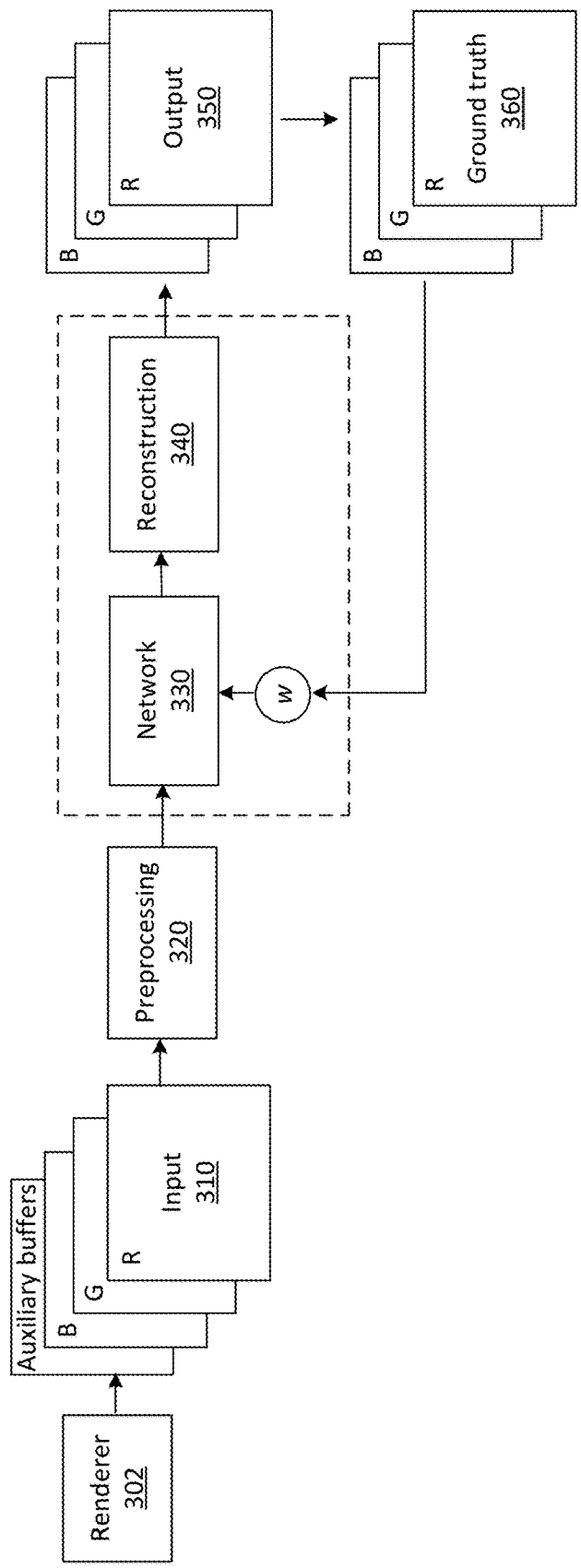
FIG. 3 illustrates an exemplary denoising pipeline according to some embodiments of the present invention.

FIG. 3 illustrates an exemplary denoising pipeline according to some embodiments of the present invention. The denoising method may include inputting raw image data (310) from a renderer 302, preprocessing (320) the input data, and transforming the preprocessed input data through a neural network 330. The raw image data may include intensity data, color data (e.g., red, green, and blue colors), and their variances, as well as auxiliary buffers (e.g., albedo, normal, depth, and their variances). The raw image data may also include other auxiliary data produced by the renderer 302. For example, the renderer 302 may also produce object identifiers, visibility data, and bidirectional reflectance distribution function (BRDF) parameters (e.g., other than albedo data). The preprocessing step 320 is optional. The neural network 330 transforms the preprocessed input data (or the raw input data) in a way that depends on many configurable parameters or weights, w, that are optimized in a training procedure. The denoising method may further include reconstructing (340) the image using the weights w output by the neural network, and outputting (350) a denoised image. The reconstruction step 340 is optional. The output image may be compared to a ground truth 360 to compute a loss function, which can be used to adjust the weights w of the neural network 330 in the optimization procedure.

C. Exemplary Neural Networks

Figure 4:
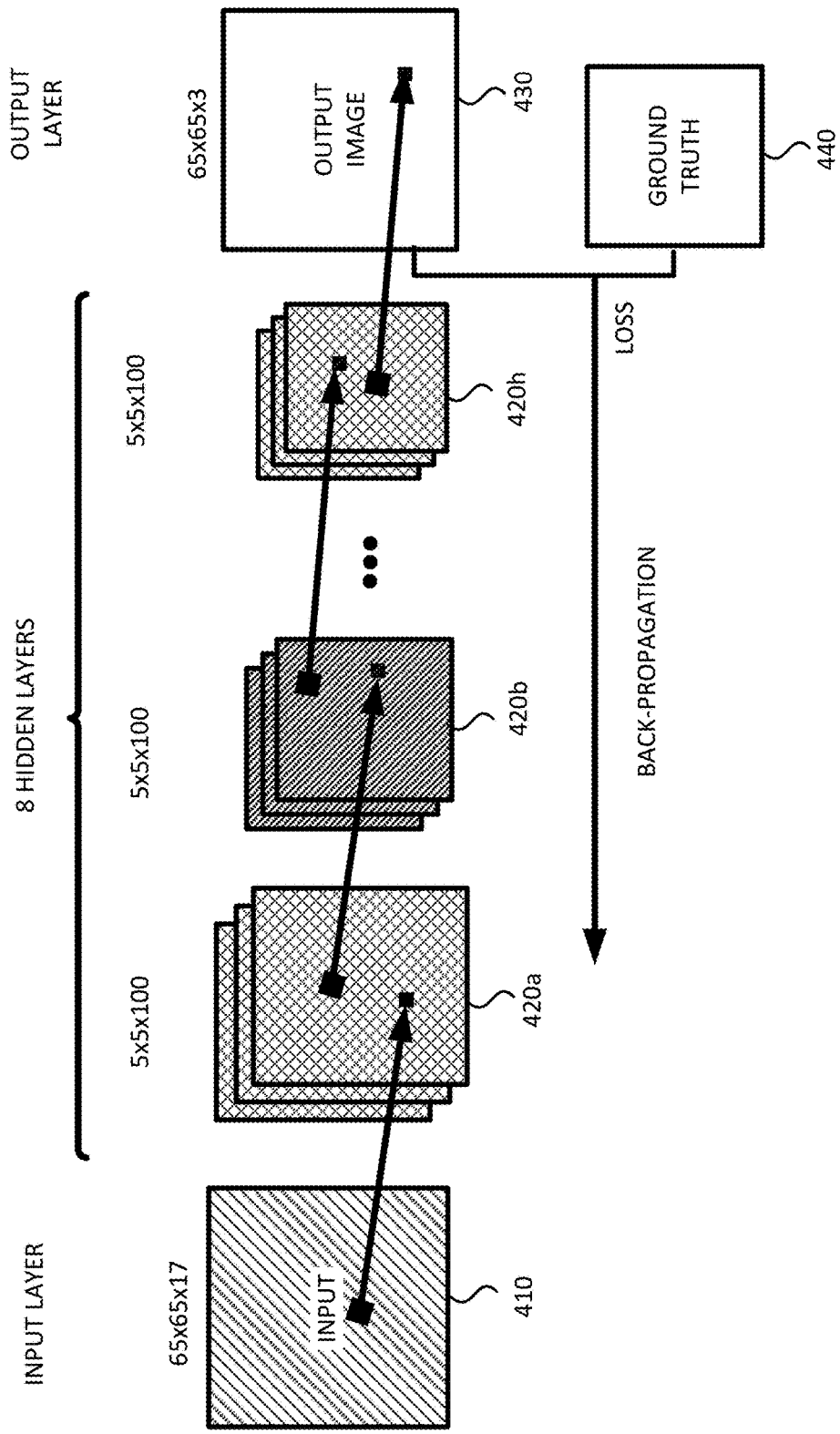
FIG. 4 illustrates an exemplary neural network for denoising an MC rendered image according to some embodiments of the present invention.

FIG. 4 illustrates an exemplary neural network (CNN) 400 for denoising an MC rendered image according to some embodiments of the present invention. The neural network 400 can include an input layer 410 that includes multiple input nodes. The input nodes can include values of one or more features of an MC rendered image. The one or more features may include, for example, RGB colors, surface normals (in the x, y, and z directions), depth, albedo, their corresponding variances, and the like. Variance can be a measure of a degree of consistency of rays traced through a pixel. For example, if all rays return similar values, a variance for the pixel can be relatively small. Conversely, if all rays return very different values, a variance for the pixel can be relatively large. In an exemplary embodiment, the input image can include 65×65 pixels, and there may be 17 features associated with each pixel, giving rise to 65×65×17 number of input nodes in the input layer 410, as illustrated in FIG. 4. In other embodiments, the input image can include more or fewer pixels, and may include more or fewer features associated with each pixel.

The neural network 400 can further include one or more hidden layers 420. In an exemplary embodiment, the neural network 400 can include 8 hidden layers 420a-420h, as illustrated in FIG. 4. In other embodiments, the neural network may include fewer or more than 8 hidden layers. Each hidden layer 420 can be associated with a local receptive field, also referred to as a kernel. The local receptive field may include a number of nodes indicating a number of pixels around a given pixel to be used when analyzing the pixel. In an exemplary embodiment, the kernel for each hidden layer 420 may be a region of 5×5 pixels, and each hidden layer 420 may include 100 features or channels, as illustrated in FIG. 4. In other embodiments, a larger or smaller kernel may be used in each hidden layer, and each hidden layer may include more or fewer features.

The neural network 400 further includes an output layer 430. The output layer 430 can include one or more output nodes. In some embodiments, the output of the convolutional neural network can be an image in a color space (e.g., RGB). For example, the output layer 430 may include 65×65×3 nodes, which represent the RGB color values for 65×65 pixels, as illustrated in FIG. 4. In other embodiments, the output image may include more or fewer pixels.

During the training of the neural network 400, the output image 430 can be compared to a ground truth 440 to compute an error function or a loss function. In some embodiments, the ground truth can be an MC rendered image of the same scene as the input image but traced with more samples per pixel (ssp), so that it is less noisy than the input image. In some other embodiments, the ground truth can be generated by applying a filter to a noisy input image. The loss function can be computed by calculating a norm of a vector between the output image 430 and the ground truth 440, where each element of the vector is a difference between values (e.g., color or intensity) of corresponding pixels in the two images. For example, the norm can be a one-norm (also known as the $L_1$ norm), which is defined as the sum of the absolute values of its components. As another example, the norm can be a two-norm (also known as the $L_2$ norm), which is defined as the square root of the sum of the squares of the differences of its components. Selection of the loss function will be discussed in more detail below.

Based on the loss function, a back-propagation process can be executed through the neural network 400 to update weights of the neural network in order to minimize the loss function. In some examples, the back-propagation can begin near the end of the neural network 400 and proceed to the beginning.

According to some embodiments, the neural network 400 can be a deep fully convolutional network with no fully-connected layers to keep the number of parameters reasonably low. This may reduce the danger of overfitting and speed up both training and inference. Stacking many convolutional layers together can effectively increase the size of the input receptive field to capture more context and long-range dependencies.

In each layer l, the neural network may apply a linear convolution to the output of the previous layer, adds a constant bias, and then apply an element-wise nonlinear transformation $f^l(\bullet)$, also known as the activation function, to produce output $z^l = f^l(W^l * z^{l-1} + b^l)$. Here, $W^l$ and $b^l$ are tensors of weights and biases, respectively (the weights in W are shared appropriately to represent linear convolution kernels), and $z^{l-1}$ is the output of the previous layer.

For the first layer, one may set $z^0 = X_p$, which provides the block of per-pixel vectors around pixel p as input to the neural network. In some embodiments, one may use rectified linear unit (ReLU) activations, $f^l(a) = \max(0, a)$, for all layers except the last layer, L. For the last layer L, one may use $f^L(a) = a$ (i.e., the identity function). Despite their $C_1$ discontinuity, ReLUs have been shown to achieve good performance in many tasks and are known to encourage the (non-convex) optimization procedure to find better local minima. The weights and biases $\theta = \{(W^1, b^1), \ldots, (W^L, b^L)\}$, represent the trainable parameters of g for an L-layer CNN.

D. Repeated Architecture

According to some embodiments, repeated architectures may be used in a neural network framework. The motivation to use repeated architectures are inspired by the work of Yang. They observe that the quality of a convolutional denoiser with a small spatial support, such as the one presented by Jain, degrades quickly as the variance of the added noise increases. A larger spatial support is required to effectively remove large amounts of noise. In the default convolutional architecture, this increases the amount of model parameters, resulting in more difficult training and a need for more training data. To tackle this issue, embodiments of the present invention leverage the fact that many denoising algorithms rely on denoising frequency sub-bands separately with the same algorithm, and then combining those frequencies. Denoising may be performed by applying an iterative procedure $s_{i+1}=s_i+D(s_i)$, n times, where $s_i$ is the input of denoising step i. The denoising function D is the same at each step. This procedure may be referred to as a 'recurrent residual' architecture. This idea may be separated into two components, "recurrent" and "residual" as follows, $$s_{i+1} = \underbrace{s_i}_{residual} + \underbrace{D(s_i)}_{recurrent}. \qquad (15)$$

According to some embodiments, the two components are separately evaluated, since they can be used independently. To avoid confusion with the popular recurrent neural networks, the "recurrent" component is referred herein as the "repeated" component.

Figure 5:
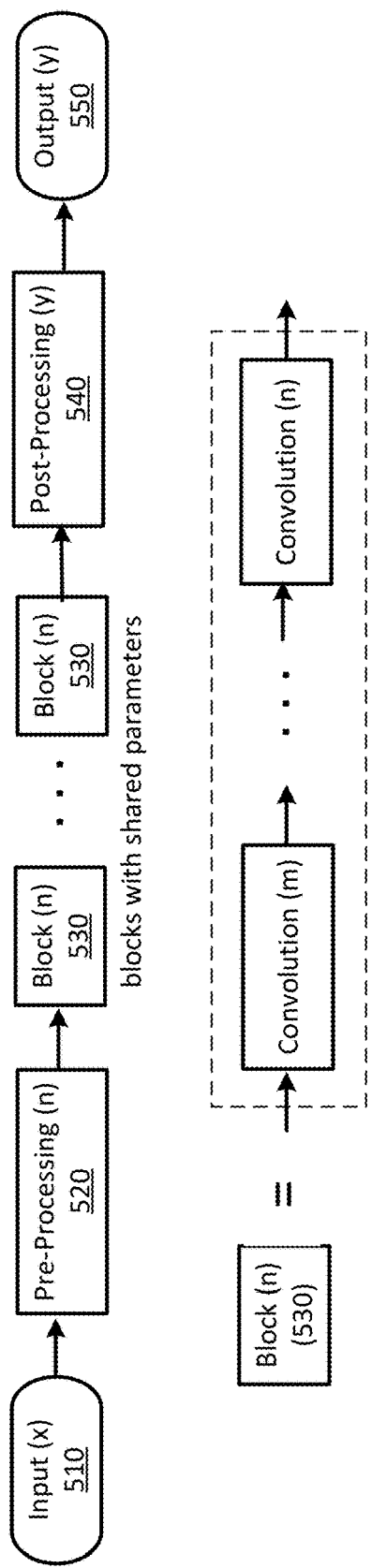
FIG. 5 illustrates a repeated-architecture according to some embodiments of the present invention.

FIG. 5 illustrates a repeated-architecture according to some embodiments. The network may start with a number of pre-processing layers 520 that transform the input 510 (e.g., with x features per pixel) to a representation of n features. This data may then be repeatedly sent through a number of blocks 530 of convolutional layers that share their parameters across the blocks. The repeated blocks 530 may output n features as well. Finally, the n channels may go through a number of post-processing layers 540 that transform the n-dimensional representation toy dimensions, the desired output dimensionality of the network.

Repeating blocks in a neural network may intuitively make sense for image denoising, as the idea may be analogus to seeing denoising as an iterative process, gradually improving the image quality.

E. Residual Architecture

Figure 6:
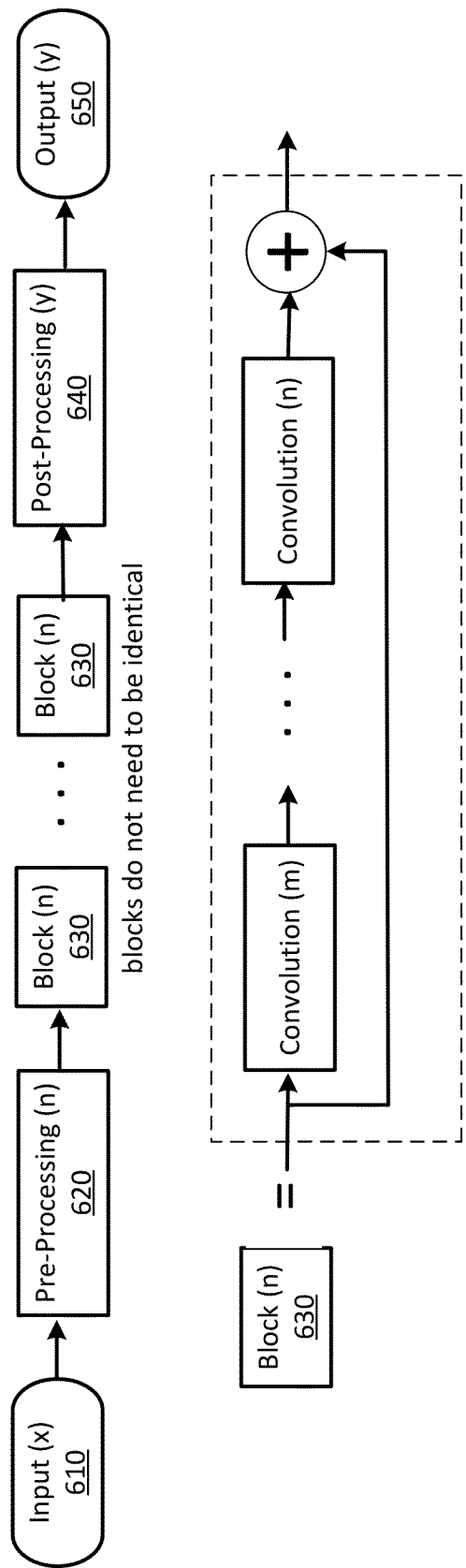
FIG. 6 illustrates a residual-architecture according to some embodiments of the present invention.

FIG. 6 illustrates a residual-architecture according to some embodiments. The numbers in parentheses indicate the number of features per pixel in a convolutional architecture. The architecture consists of (i) a pre-processing stage 620, which transforms the x-dimensional input representation 610 to an n-dimensional internal representation by convolutional transformations, (ii) residual blocks 630 of convolutional layers, at the end of which the input is added to the output, and (iii) a post-processing stage 640, which transforms the n-dimensional internal representation to a y-dimensional output 650 through a number of convolutional layers.

More particularly, a residual block in a feed-forward neural network adds a "skip connection" between its input and its output, as illustrated in FIG. 6. The block can be modeled as, $$\vec{o} = R(\vec{\iota})_{\vec{w}} + \vec{\iota} \qquad (16)$$

where $\vec{\iota}$ and $\vec{o}$ are the input and output of the block, R is the block's function without skip connection, and $\vec{w}$ represents the set of model parameters of R. When R is a traditional convolutional neural network, and all parameters $\vec{w}=0$, the block represents the identity function.

Residual blocks for denoising can be motivated by intuition as well. Assume a network with only one block. When the noisy image is unbiased (e.g., its distribution has zero mean), the expected required "update" from a residual block is zero as well. This makes the output centered around zero across pixels.

F. Reconstruction

According to some embodiments, the function g outputs denoised color values using two alternative architectures: a direct-prediction convolutional network (DPCN) or a kernel-prediction convolutional network (KPCN).

1. Direct Prediction Convolutional Network (DPCN)

To produce the denoised image using direct prediction, one may choose the size of the final layer L of the network to ensure that for each pixel p, the corresponding element of the network output, $z_p^L \in \mathbb{R}^3$ is the denoised color:

$$\hat{c}_p = g_{direct}(X_p; \theta) = z_p^L. \qquad (17)$$

Direct prediction can achieve good results in some cases. However, it is found that the direct prediction method can make optimization difficult in some cases. For example, the magnitude and variance of the stochastic gradients computed during training can be large, which slows convergence. In some cases, in order to obtain good performance, the DPCN architecture can require over a week of training.

2. Kernel Prediction Convolutional Network (KPCN)

According to some embodiments of the present invention, instead of directly outputting a denoised pixel, $\hat{c}_p$, the final layer of the network outputs a kernel of scalar weights that is applied to the noisy neighborhood of p to produce $\vec{c}_p$. Letting $\mathcal{N}(p)$ be the k×k neighborhood centered around pixel p, the dimensions of the final layer can be chosen so that the output is $z_p^L \in \mathbb{R}^{k \times k}$. Note that the kernel size k may be specified before training along with the other network hyperparameters (e.g., layer size, CNN kernel size, and so on), and the same weights are applied to each RGB color channel.

Figure 7:
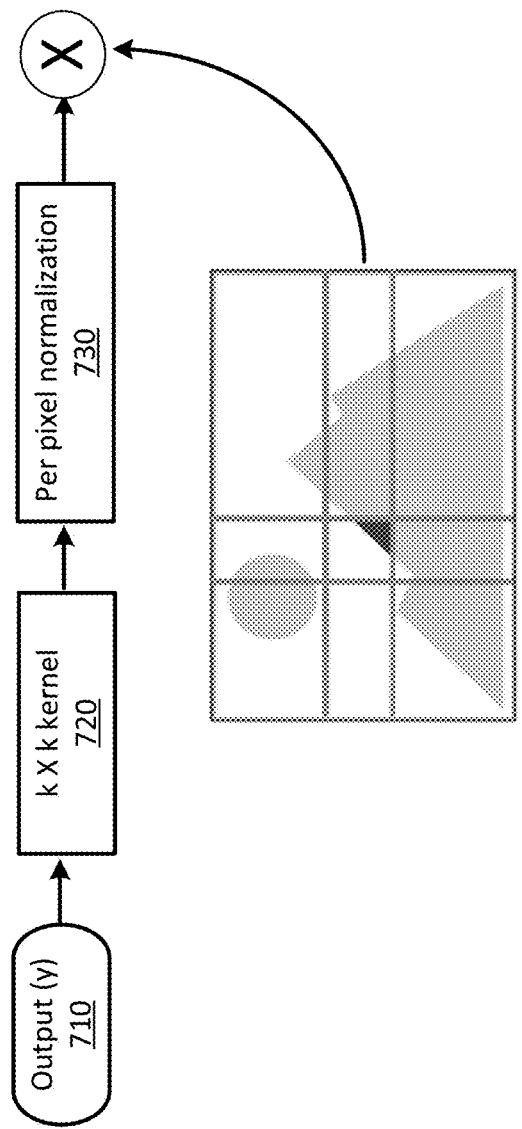
FIG. 7 illustrates a kernel-prediction reconstruction architecture according to some embodiments of the present invention.

FIG. 7 illustrates a kernel-prediction reconstruction architecture according to some embodiments. In the kernel-prediction reconstruction, the network predicts a local k×k filter kernel or weights at each pixel. The trained output 710 of the network is transformed to a $k^2$-dimensional representation 720 per pixel. The predicted weights are then normalized 730, after which they are applied to the noisy color channel of $\mathcal{I}$ by computing local dot products of pixels in a neighborhood around a target pixel and the predicted weights (as illustrated by the "X" symbol in FIG. 7).

Defining $[z_p^L]_q$ as the q-th entry in the vector obtained by flattening $z_p^L$, one may compute the final, normalized kernel weights as, $$w_{pq} = \frac{\exp([z_p^L]_q)}{\sum_{q' \in N(p)} \exp([z_p^L]_{q'})}. \qquad (18)$$

The denoised pixel color may be computed as, $$\hat{c}_p = g_{weighted}(X_p; \theta) = \sum_{q \in \mathcal{N}(p)} c_q w_{pq}. \qquad (19)$$

The kernel weights can be interpreted as including a softmax activation function on the network outputs in the final layer over the entire neighborhood. This enforces that $0 \leq w_{pq} \leq 1$, $\forall q \in \mathcal{N}(p)$ and $\sum_{q \in \mathcal{N}(p)} w_{pq} = 1$.

This weight normalization architecture can provide several advantages. First, it may ensure that the final color estimate always lies within the convex hull of the respective neighborhood of the input image. This can vastly reduce the search space of output values as compared to the direct-prediction method and avoids potential artifacts (e.g., color shifts). Second, it may ensure that the gradients of the error with respect to the kernel weights are well behaved, which can prevent large oscillatory changes to the network parameters caused by the high dynamic range of the input data. Intuitively, the weights need only encode the relative importance of the neighborhood; the network does not need to learn the absolute scale. In general, scale-reparameterization schemes have recently proven to be beneficial for obtaining low-variance gradients and speeding up convergence. Third, it can potentially be used for denoising across layers of a given frame, a common case in production, by applying the same reconstruction weights to each component.

As described further below, although both direct prediction method and kernel prediction method can converge to a similar overall error, the kernel prediction method can converge faster than the direct prediction method.

G. Decomposition of Diffuse and Specular Components

Denoising the color output of a MC renderer in a single filtering operation can be prone to overblurring. This may be in part because the various components of the image have different noise characteristics and spatial structure, which can lead to conflicting denoising constraints. According to some embodiments of the present invention, to mitigate this issue, the input image can be decomposed into diffuse and specular components as in Zimmer et al. The diffuse and specular components are then independently preprocessed, filtered, and postprocessed, before recombining them to obtain the final image.

Figure 8:
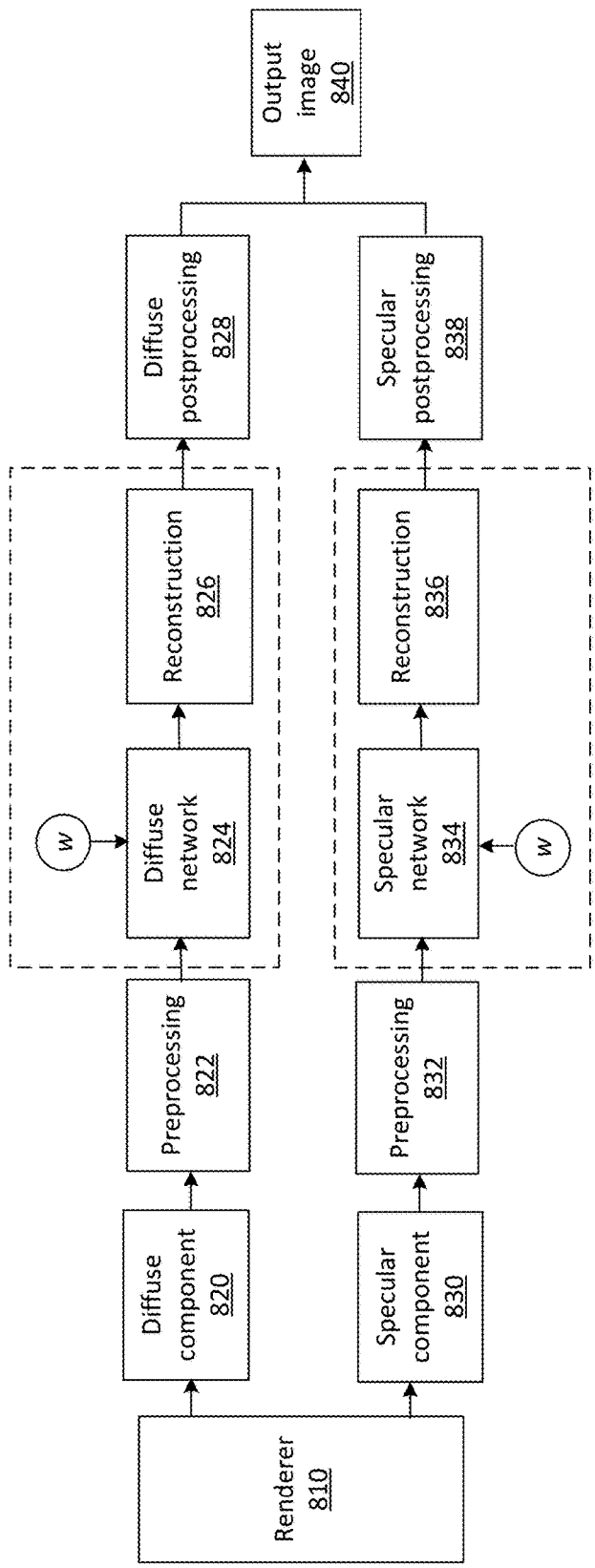
FIG. 8 illustrates an exemplary denoising pipeline according to some embodiments of the present invention.

FIG. 8 illustrates an exemplary denoising pipeline according to some embodiments of the present invention. The denoising method may include inputting from a render 810 a diffuse component 820 and a specular component 830 of an MC rendered image, which are subsequently independently preprocessed, denoised, and postprocessed. Thus, the method can further include preprocessing the diffused component (822), transforming the preprocessed diffused component through a diffuse network 824, reconstructing the diffused component (826), and postprocessing the reconstructed diffuse component (828). Similarly, the method can further include preprocessing the specular component (832), transforming the preprocessed specular component through a specular network 834, reconstructing the specular component (836), and postprocessing the reconstructed specular component (838). The postprocessed diffuse component and the postprocessed specular component can then be combined to produce an output image 840. The preprocessing steps 822 and 832, and the postprocessing steps 828 and 838 are optional.

1. Diffuse-Component Denoising

Figure 9:
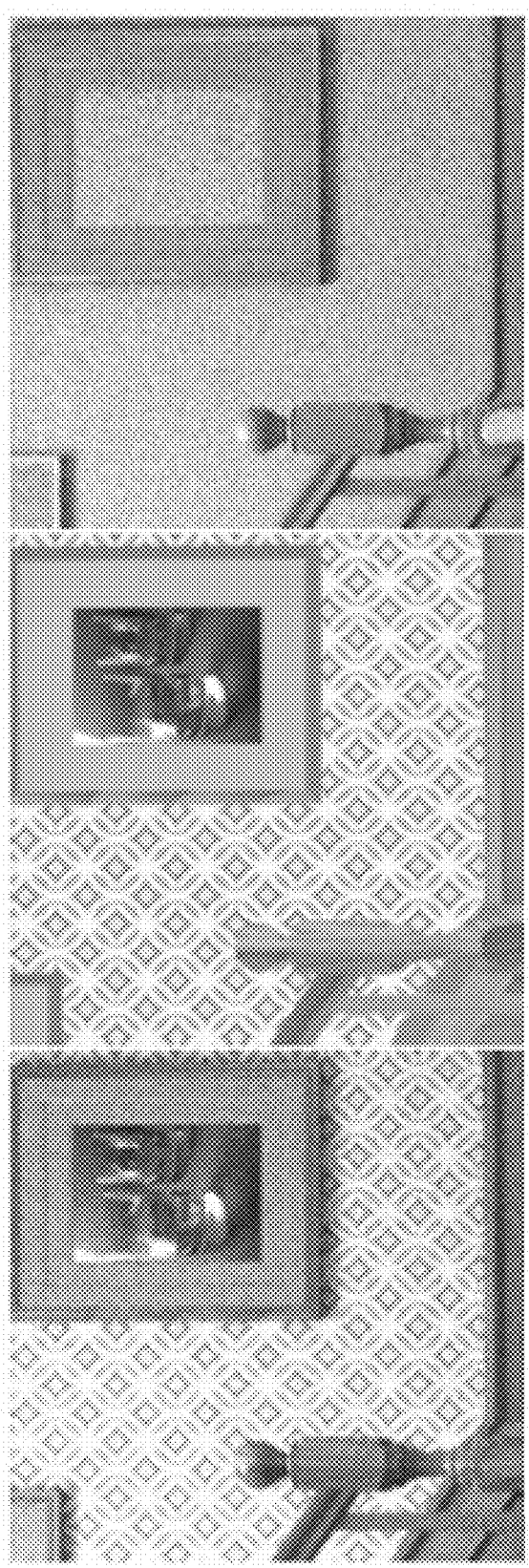
FIGS. 9A-9C show (A) an exemplary diffuse color, (B) the albedo, and (C) the irradiance after the albedo has been factored out from the diffuse color according to some embodiments of the present invention.

The diffuse color—the outgoing radiance due to diffuse reflection—is usually well behaved and may have low dynamic ranges. Thus, training the diffuse network can be stable and the resulting network can yield good performance without color preprocessing. However, it may be advantageous to factor out the noisy albedo from the diffuse color in a preprocessing step. Albedo, also referred to as texture, is a measure of local diffuse reflecting power of a surface. FIGS. 9A-9C show (A) an exemplary diffuse color, (B) the albedo, and (C) the irradiance after the albedo has been factored out from the diffuse color. The albedo produced by a renderer normally has much less noise than the irradiance, as illustrated in FIGS. 9B and 9C. The albedo can be easily extracted from the renderer. It has been demonstrated that denoising the albedo and irradiance separately can improve the performance. (See Zimmer.)

Figure 10:
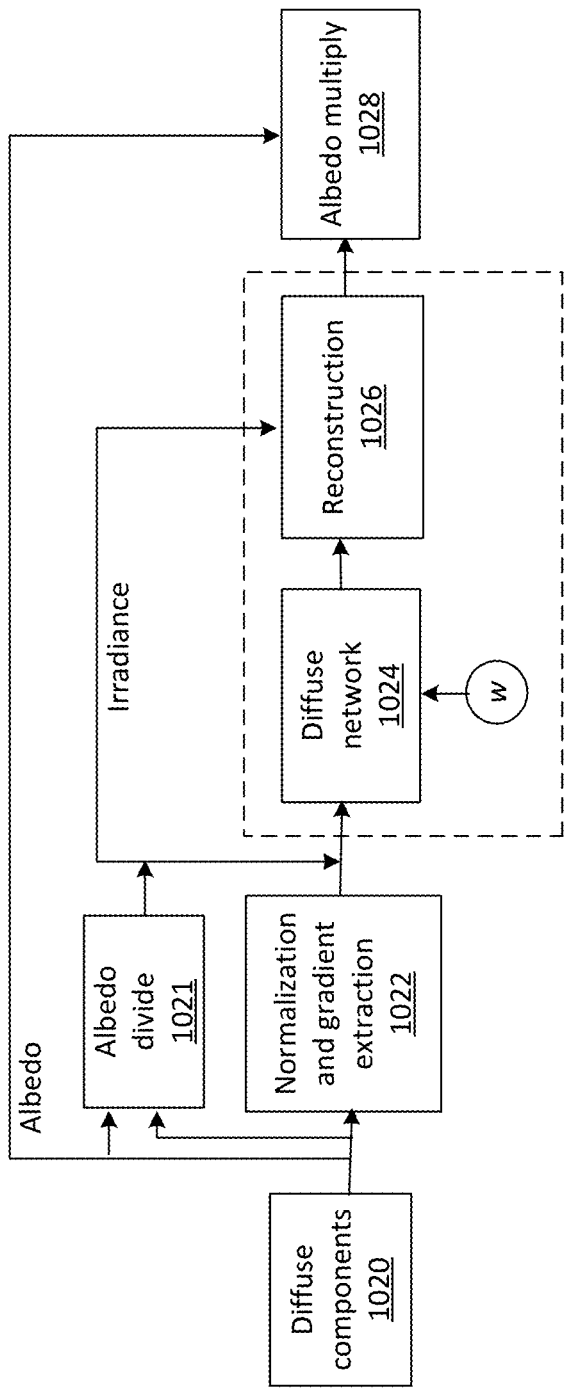
FIG. 10 illustrates an exemplary denoising pipeline for the diffuse components of input images according to some embodiments of the present invention.

FIG. 10 illustrates an exemplary denoising pipeline for the diffuse components of input images according to some embodiments of the present invention. The diffuse components 1020 may include irradiance data, color data, their variances, as well as auxiliary buffers such as albedo, normal, depth, and their variances. The method may include factoring out the albedo (1021) from the diffuse color 1020 to obtain an effective irradiance as, $$\bar{c}_{diffuse} = c_{diffuse} \oslash (f_{albedo} + \varepsilon), \qquad (20)$$

where $\oslash$ is an element-wise (Hadamard) division, and $\varepsilon$ is a constant. In one example, $\varepsilon = 0.00316$.

The method may further include normalizing the effective irradiance as a preprocessing step (1022). The normalization step is optional.

The method may further include extracting gradients from the effective irradiance as another preprocessing step (1022).

The method may further include denoising the normalized effective irradiance through the diffuse network 1024, and reconstructing a denoised effective irradiance (1026). Because the effective irradiance is generally smoother than the original irradiance, factoring out the albedo before denoising may allow larger filtering kernels to be used in the diffuse network 1024. The diffuse network 1024 may be trained using diffuse references.

The method may further include multiplying back the albedo to the denoised effective irradiance to obtain a denoised irradiance (1028) as, $$\hat{c}_{diffuse} = (f_{albedo} + \varepsilon) \odot \hat{\bar{c}}_{diffuse}, \qquad (21)$$

where $\odot$ is an element-wise (Hadamard) product, thereby restoring all texture detail.

In some embodiments, the albedo data used in the multiplication step 1028 may be extracted from a separate, higher sampling rate pass so that they have relatively low noise. In practice, the low-noise albedo can be generated from either a fast high-sample count renderer that ignores illumination calculations, or alternatively from a separate denoising process (e.g., pre-filtering).

2. Specular-Component Denoising

Denoising the specular color can be a challenging problem due to the high dynamic range of specular and glossy reflections. The values in one image can span as much as several orders of magnitude in some cases. The large variations and arbitrary correlations in input images can make the iterative optimization process highly unstable. Thus, according to some embodiments of the present invention, a logarithmic transform is applied to the specular color as a preprocessing step.

Figure 11:
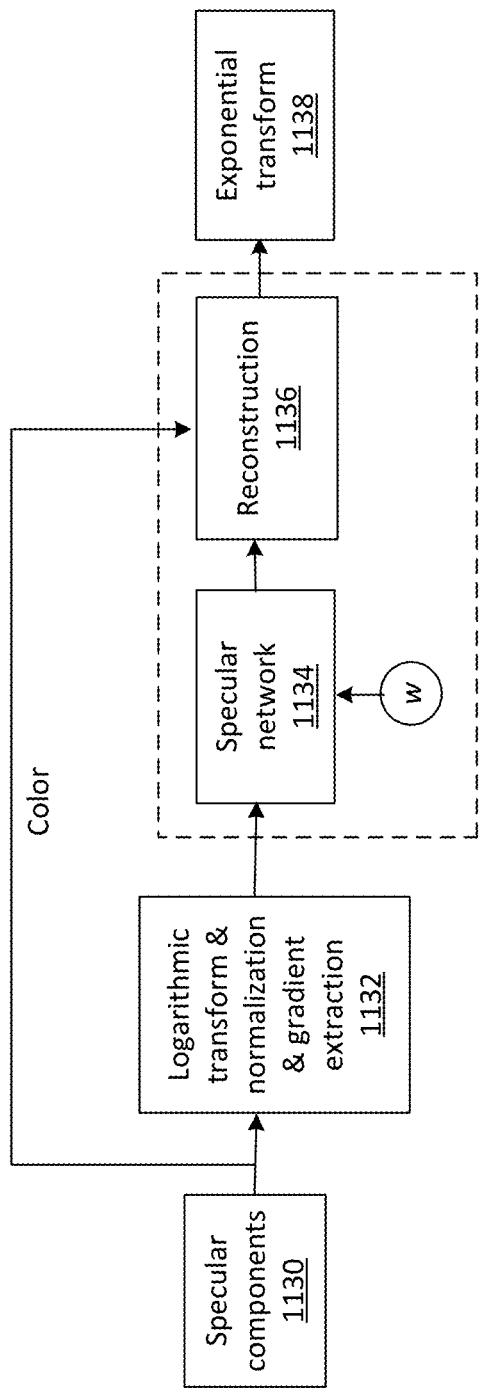
FIG. 11 illustrates an exemplary denoising pipeline for the specular components of input images according to some embodiments of the present invention.

FIG. 11 illustrates an exemplary denoising pipeline for the specular components of input images according to some embodiments of the present invention. The specular components 1130 may include irradiance data, color data, their variances, as well as auxiliary buffers such as albedo, normal, depth, and their variances. The method may include applying a logarithmic transform in a preprocessing step (1132) to each color channel of the specular component (1130) of an input image to yield, $$\bar{c}_{specular} = \log(\varepsilon + c_{specular}), \qquad (22)$$

where $\varepsilon$ is a constant that can have a value of one or less than one.

Figure 12B:
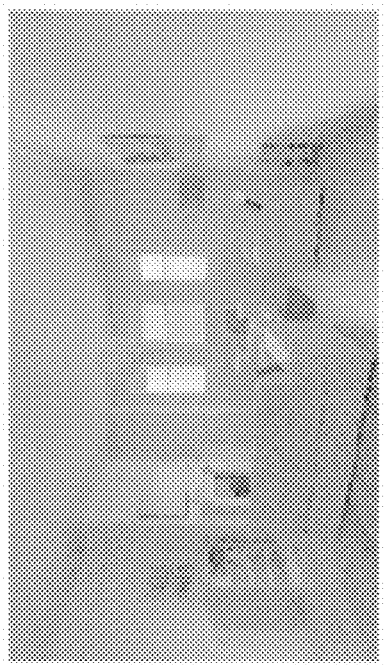
FIGS. 12A and 12B show an exemplary image before and after a logarithmic transformation, respectively, according to some embodiments of the present invention.
Figure 12D:
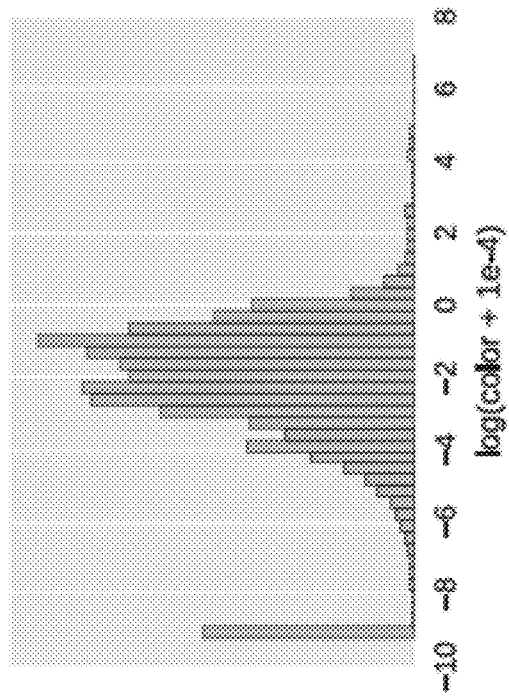
FIGS. 12C and 12D show intensity histograms of the image before and after the logarithmic transformation, respectively, according to some embodiments of the present invention.
Figure 12A:
Figure 12C:
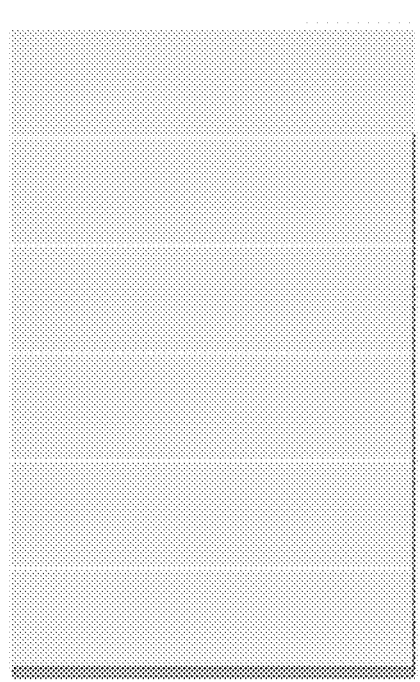

The logarithmic transform can significantly reduce the range of color values, and thus can significantly improve denoising performance as well as avoid artifacts in regions with high dynamic range. FIGS. 12A and 12B show an exemplary image before and after a logarithmic transformation, respectively. The images are colored to show the brightest color in white and the darkest in black. FIGS. 12C and 12D show intensity histograms of the image before and after the logarithmic transformation, respectively. As illustrated in FIG. 12C, the distribution of features are quite skewed before the logarithmic transformation. The Logarithmic transformation removes most of the skewness in the distribution, as illustrated in FIG. 12D.

The method may further include normalizing the log-transformed specular color and extracting gradients from the normalized specular color as further preprocessing steps (1132). The normalization step is optional.

The method may further include denoising the normalized specular color through the specular network 1134, and reconstructing a denoised specular color (1136). The specular network 1134 may be trained using specular references.

The method may further include performing an inverse logarithmic transformation to the denoised specular color (1138) to obtain a final denoised specular component as, $$\hat{c}_{specular} = \exp(\tilde{c}_{specular}) - \varepsilon. \quad (23)$$

3. Fine Tuning the Final Image

The denoised diffuse component and specular component can then be combined to obtain a final denoised image as, $$\hat{c} = \hat{c}_{diffuse} + \hat{c}_{specular}. \quad (24)$$

In some embodiments, the diffuse network 924 and the specular network 1134 are pre-trained separately on the diffuse references and specular references, respectively. Afterwards, Eq. (24) may be applied to obtain a final denoised image. Fine tuning of the complete framework may be then performed by minimizing the error of the final image for additional iterations. This may allow for recovering missing details and obtaining sharper results.

H. Exemplary Embodiments

1. Input Data and Preprocessing

Training a deep neural network may require a large and representative training dataset in order to learn the complex relationship between input and output while avoiding overfitting. In some embodiments, 600 representative frames sampled from a first movie generated using RenderMan's path-tracer are used as a training dataset. Twenty five diverse frames from a second movie and a third movie are used as a test dataset. These frames contain effects such as motion blur, depth of field, glossy reflections, and global illumination. They significantly differ in style and content, which can be helpful in testing how the denoising methods can generalize to new inputs. For example, the test dataset can include mostly outdoor scenes with a wide-range of color palettes that are very different from the first movie.

In some embodiments, the reference images (i.e., the ground truths) for training are rendered with 1024 samples per pixel (spp). Removing the residual noise from these images using standard MC denoisers is considered. But it is found that the networks performed better when trained on images with uncorrelated residual noise rather than correlated errors and artifacts introduced by the additional denoising step.

Figure 13:
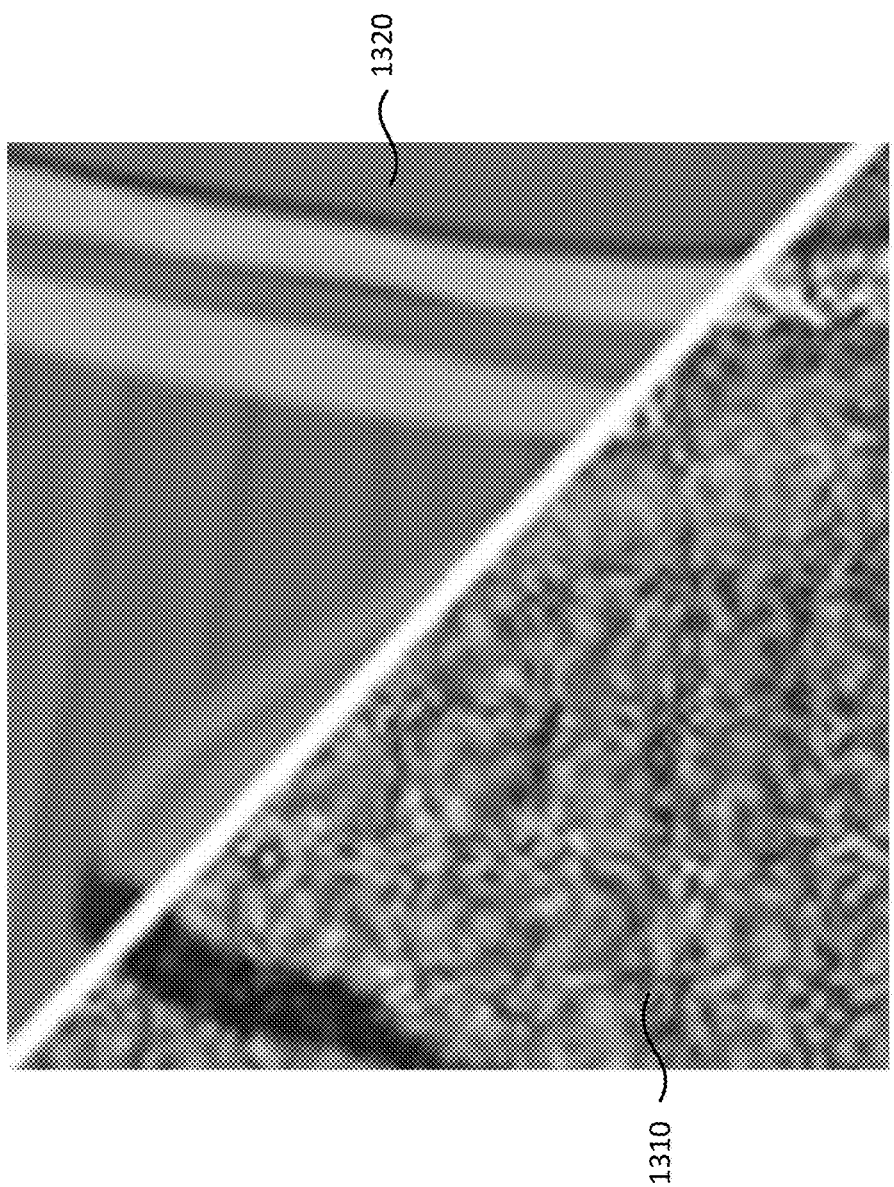
FIG. 13 shows an exemplary noisy input image rendered with 32 spp, and a corresponding reference image rendered with 1021 spp.

FIG. 13 shows an exemplary noisy input image 1310 rendered with 32 spp, and a corresponding reference image 1320 rendered with 1021 spp.

Figure 14:
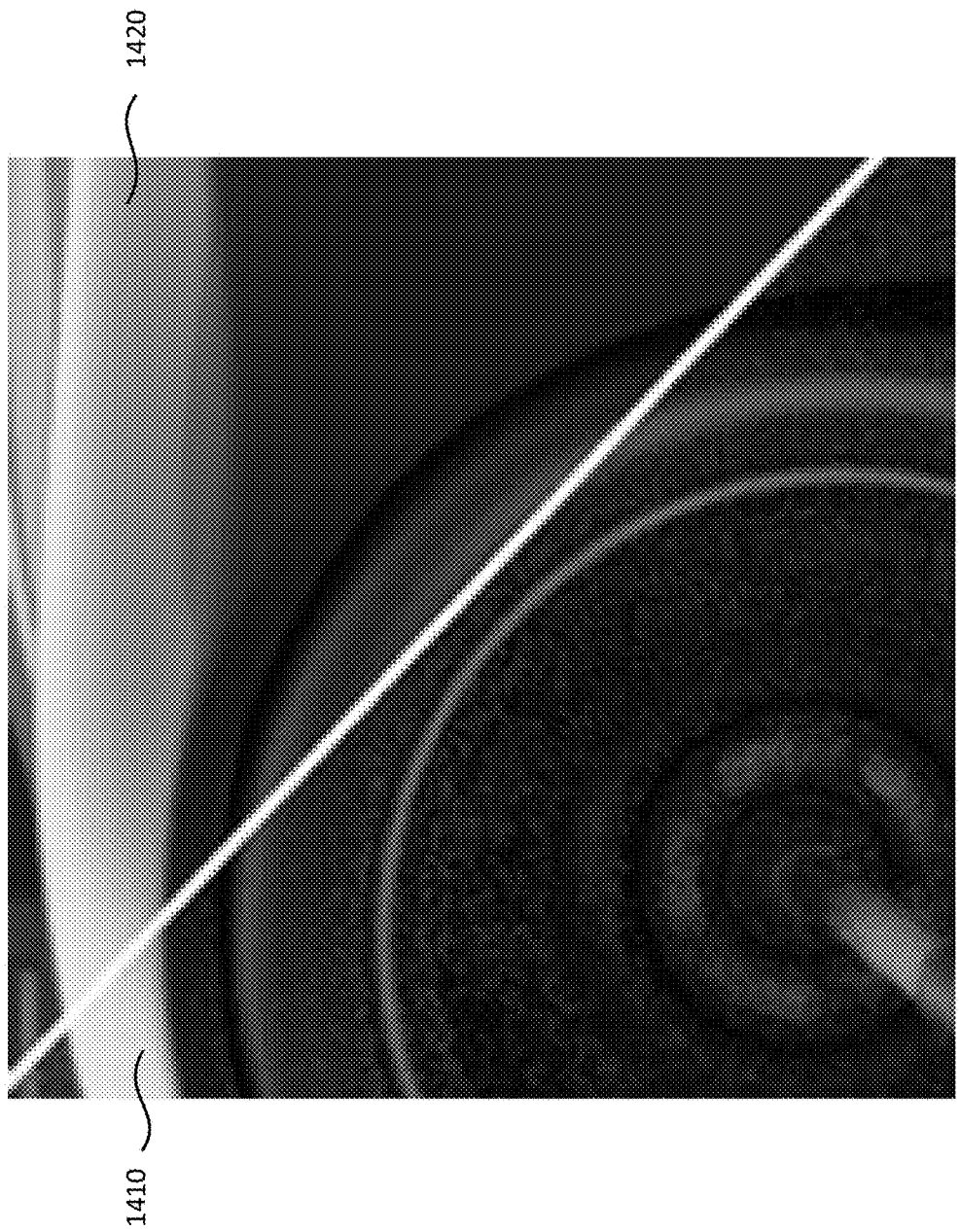
FIG. 14 shows an exemplary noisy input image rendered with 32 spp, and a corresponding denoised image according to some embodiments of the present invention.

FIG. 14 shows an exemplary noisy input image 1410 rendered with 32 spp, and a corresponding denoised image 1420 according to some embodiments of the present invention. As illustrated, production-quality results can be achieved using the denoising methods disclosed herein.

In some embodiments, to evaluate the denoising methods, training, validation, and testing are performed on inputs rendered at a fixed 128 spp (for production-level quality) and 32 spp (for pre-visualization). For each scene, the renderer outputs the diffuse and specular RGB color buffers $c_{diffuse}$ and $c_{specular}$, the corresponding per-pixel color variances $\sigma_{diffuse}^2$ and $\sigma_{specular}^2$, the feature buffers f, consisting of surface normals (3 channels), albedo (3 channels), depth (1 channel), and the corresponding per-pixel feature variances $\sigma_f^2$. In some embodiments, variances of three channels are converted to a single channel by computing its luminance. Thus, there may be two channels for the color variance (for diffuse and specular) and three channels for the feature variance.

In some embodiments, the raw data is preprocessed to provide the network with more useful features that facilitate learning and convergence. For example, since the depth values can have arbitrary ranges, they are linearly scaled to the range [0,1] for each frame. The color buffers may also be preprocessed as described above to obtain $\tilde{c}_{diffuse}$ and $\tilde{c}_{specular}$. In addition, the gradients in both x and y directions, $G_x$ and $G_y$, may be extracted for all buffers. It is found that the gradients can highlight important details in the images, which can facilitate training.

Since the color buffers are preprocessed, an appropriate transformation may need to be applied to their variances to make them valid. In general, if a transformation, h, is applied to a random variable, X, a corresponding transformation can be approximated on its second moment using a Taylor series expansion: $\sigma_{h(X)}^2 \approx (h'(\mu_X))^2 \sigma_X^2$, where $\mu_X$ and $\sigma_X^2$ are the mean and variance of X, respectively, and h' is the derivative with respect to X. Thus, for the diffuse and specular components, the modified variance may be given by, $$(\tilde{\sigma}_{diffuse})^2 \approx \sigma_{diffuse}^2 \oslash (f_{albedo} + \varepsilon)^2, \quad (25)$$

and $$(\tilde{\sigma}_{specular})^2 \approx \sigma_{specular}^2 \oslash (\tilde{c}_{specular})^2, \quad (26)$$

respectively. After this processing, the network input may be reconstructed as, $$x = \{\tilde{c}, G_x(\{\tilde{c}, f\}), G_y(\{\tilde{c}, f\}), \tilde{\sigma}^2, \sigma_f^2\}, \quad (27)$$

where $\tilde{c}$ and $\tilde{\sigma}^2$ are either diffuse or specular.

a) Importance Sampling

In some embodiments, after preprocessing the input data at each pixel, the images are split into 65×65 patches that are sampled, shuffled, and used to train the network. Although uniform sampling could be used to select the patches from each frame, it is found that this can be suboptimal as the network would be frequently shown simple cases containing smooth regions that are straightforward to denoise. Therefore, it may be advantageous to expose the network to more difficult cases and make it learn how to handle them.

In some embodiments, the following sampling strategy may be used. For example, to obtain 400 patches for each 1920×1080 frame, "dart throwing" may be initially used to find candidate patches, which are then pruned using a probability density function (PDF) based on the variance of the noisy color buffer and the shading normals. Using the color ensures that we target regions that have lots of noise, detail, or texture, while using the normal buffer provides examples with geometric complexity. To provide a proper balance between the easy and hard cases and avoid biasing the network, a patch may be automatically accepted after it has been rejected a certain number of times.

2. Training

In an exemplary embodiment, eight hidden layers (i.e., nine total convolutions, so L=9) with 100 kernels of 5×5 in each layer are used for each network. For a kernel-prediction convolutional network (KPCN), an output kernel with size k=21×21 is used. Weights of the networks for both the 128 and 32 spp datasets are initialized using the Xavier method (see Glorot and Bengio). For example, random values can be generated from a uniform distribution with a variance determined by the number of nodes between layers.

The specular and diffuse networks are trained independently using the $l_1$ (absolute value) error metric. It is observed that this loss function offered the best perceptual quality while still being fast to compute and optimize (see further discussions below). The loss for the diffuse network may be computed between the reconstructed irradiance (i.e., before multiplying with the albedo) and the albedo-factorized reference image. The loss for the specular network may be computed in the log domain.

The networks may be optimized using the Adaptive Moment Estimation (ADAM) optimizer (see Kingma and Ba) in TensorFlow (see Abadi) with a learning rate of $10^{-5}$ and mini-batches of size 5. Each network may be pre-trained for approximately 750 thousands iterations over the course of 1.5 days on an Nvidia Quadro M6000 GPU. Afterwards, the system is combined and fine-tuned as discussed above for another 0.5 days or 250 thousands iterations.

3. Results

Figure 15C:
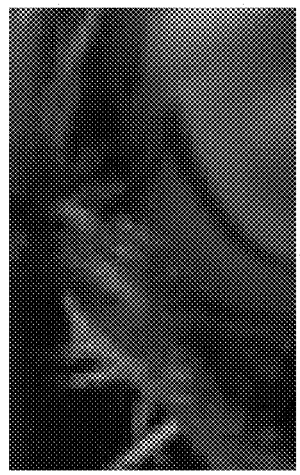
FIG. 15C shows a corresponding reference image rendered with about 1-4 thousands ssp.
Figure 15B:
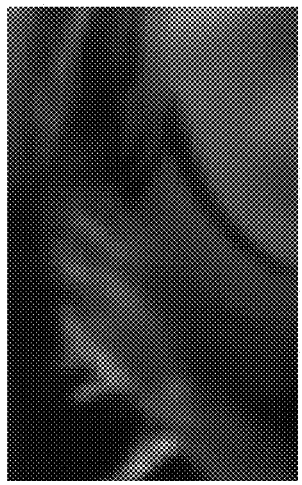
FIG. 15B shows a corresponding denoised image according to some embodiments of the present invention.
Figure 15A:
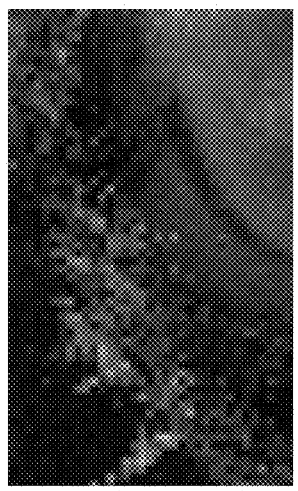
FIG. 15A shows an exemplary input image rendered with 32 spp.

Test results demonstrate that favorable results can be achieved using the denoising methods disclosed herein relative to existing denoisers on 32 spp production-quality data both perceptually and quantitatively. As an example, FIG. 15A shows an exemplary input image rendered with 32 spp. FIGS. 15B and 15C show a corresponding denoised image using the methods disclosed herein, and a corresponding reference image rendered with about 1-4 thousands ssp, respectively, according to some embodiments of the present invention. As illustrated in FIG. 15B, the noise on the child's face is mostly removed in the denoised image while still preserving details.

Figures 16A, 16B, 16C:
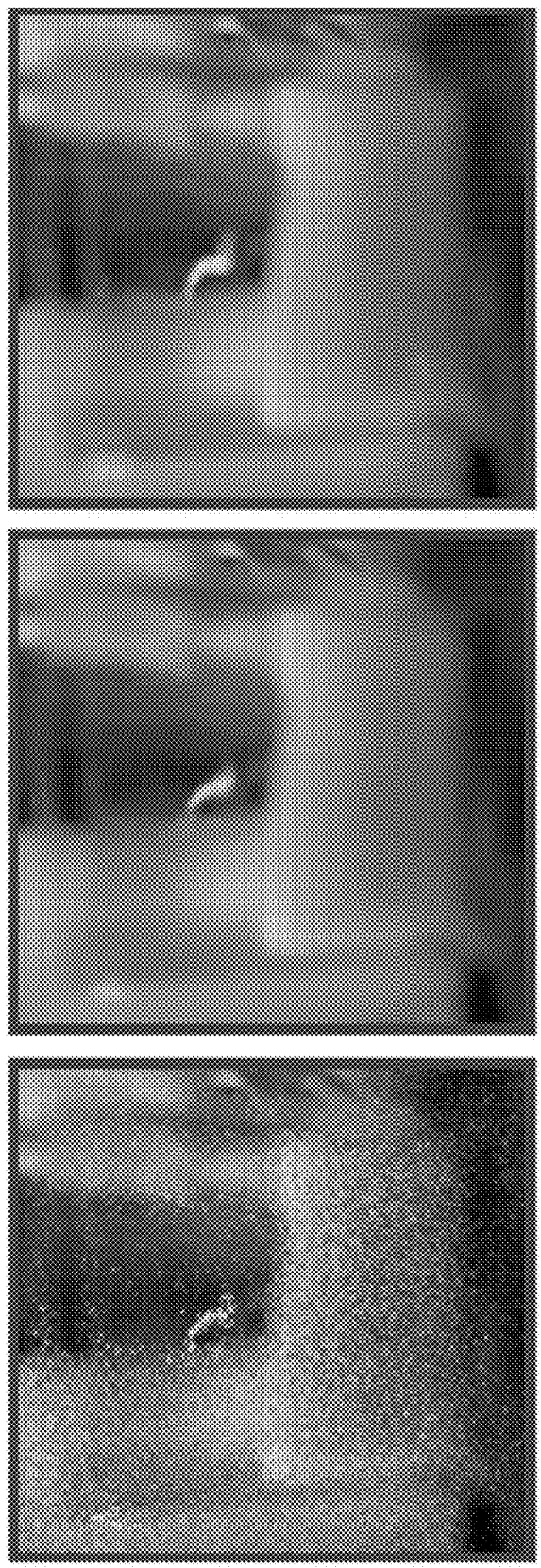
FIG. 16A shows another exemplary input image rendered with 32 spp.
FIG. 16B shows a corresponding denoised image according to some embodiments of the present invention.
FIG. 16C shows a corresponding reference image rendered with about 1-4 thousands ssp.

As another example, FIG. 16A shows another exemplary input image rendered with 32 spp. FIGS. 16B and 16C show a corresponding denoised image using methods disclosed herein, and a corresponding reference image rendered with about 1-4 thousands ssp, respectively, according to some embodiments of the present invention. As illustrated in FIG. 16B, the present approach can generate a smooth result on the glass.

As a further example, FIG. 17A shows yet another exemplary input image rendered with 32 spp. FIGS. 17B and 17C show a corresponding denoised image using methods disclosed herein, and a corresponding reference image rendered with about 1-4 thousands ssp, respectively, according to some embodiments of the present invention. As illustrated in FIG. 17B, the present approach can generate a smooth result while keeping the energy of the strong specular highlight.

To demonstrate that the methods disclosed herein can perform well on noisier data from a different rendering system, denoising is performed on publicly available Tungsten scenes. FIGS. 18A-18C show an input image rendered with Tungsten (128 spp), a corresponding denoised image using methods disclosed herein, and a reference image (rendered with 32K spp), respectively, for an exemplary scene according to some embodiments of the present invention. FIGS. 18D-18F show an input image rendered with Tungsten (128 spp), a corresponding denoised image using methods disclosed herein, and a reference image (rendered with 32K spp), respectively, for another exemplary scene according to some embodiments of the present invention. As illustrated, good denoising performance can be achieved using the methods disclosed herein. To produce these results, the network was trained on a set of Tungsten training scenes obtained as the following. Eight Tungsten scenes that were not in the test set were taken and randomly modified in various ways, including swapping materials, camera parameters, and environment maps to generate 1484 unique training scenes.

4. Case Studies

In some embodiments, various design choices made in the network architecture are evaluated using hold-out frames from a movie and test frames from another movie. For example, the choice of loss function, the comparison of direct prediction convolutional network (DPCN) and kernel prediction convolutional network (KPCN), the effects of decomposition of diffuse and specular components, and the effects of including additional features (e.g., shading normal, depth, albedo) are studied.

a) Loss Functions

The choice of loss function can be an important aspect of a network design. For MC denoising, ideally a loss function should reflects the perceptual quality of the image relative to the reference. To evaluate the behavior of various error metrics, the network was optimized with different loss functions including: $l_1$, relative $l_1$, $l_2$, relative $l_2$, and structural similarity index (SSIM). The denoising performance is evaluated in terms of $l_1$, relative $l_1$, $l_2$, relative $l_2$, and SSIM in turn.

Figure 19A:
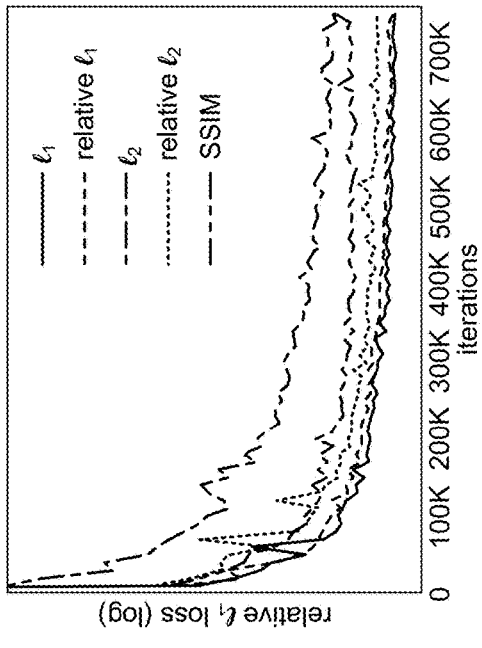
FIG. 19A shows the performance of the network evaluated in terms of $l_1$, where optimization is performed using $l_1$, relative $l_1$, $l_2$, relative $l_2$, and SSIM loss functions.
Figure 19B:
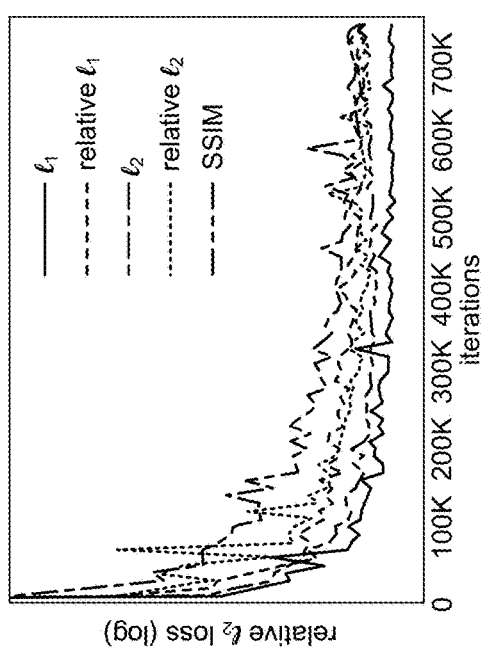
FIG. 19B shows the performance of the network evaluated in terms of relative $l_1$, where optimization is performed using $l_1$, relative $l_1$, $l_2$, relative $l_2$, and SSIM loss functions.
Figure 19C:
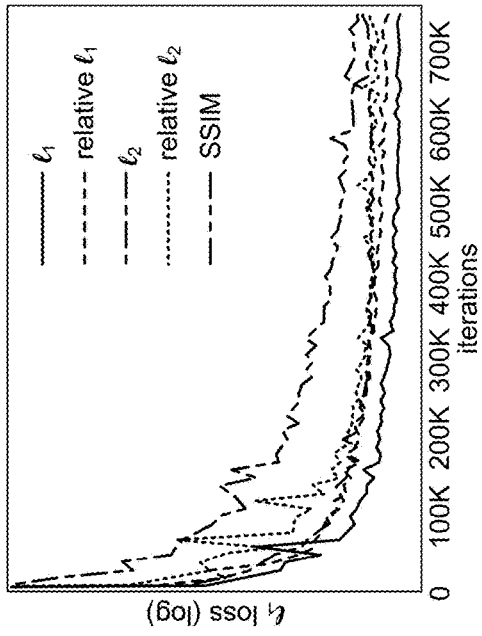
FIG. 19C shows the performance of the network evaluated in terms of $l_2$, where optimization is performed using $l_1$, relative $l_1$, $l_2$, relative $l_2$, and SSIM loss functions.
Figure 19D:
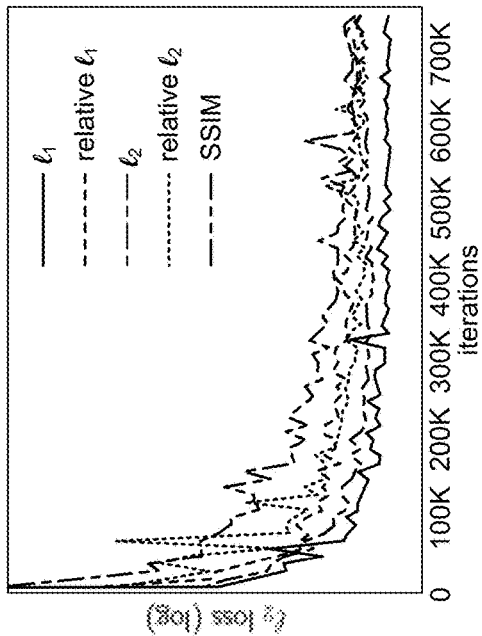
FIG. 19D shows the performance of the network evaluated in terms of relative $l_2$, where optimization is performed using $l_1$, relative $l_1$, $l_2$, relative $l_2$, and SSIM loss functions.
Figure 19E:
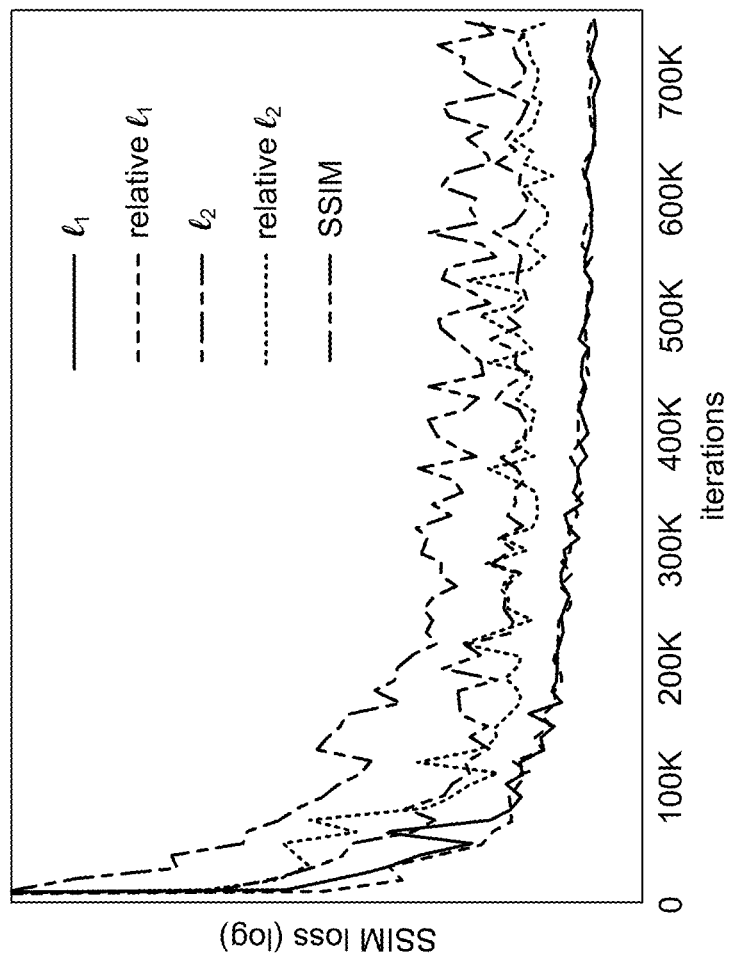
FIG. 19E shows the performance of the network evaluated in terms of SSIM, where optimization is performed using $l_1$, relative $l_1$, $l_2$, relative $l_2$, and SSIM loss functions, according to various embodiments.

FIG. 19A shows the performance of the network evaluated in terms of $l_1$, where optimization is performed using $l_1$, relative $l_1$, $l_2$, relative $l_2$, and SSIM loss functions. FIG. 19B shows the performance of the network evaluated in terms of relative $l_1$, where optimization is performed using $l_1$, relative $l_1$, $l_2$, relative $l_2$, and SSIM loss functions. FIG. 19C shows the performance of the network evaluated in terms of $l_2$, where optimization is performed using $l_1$, relative $l_1$, $l_2$, relative $l_2$, and SSIM loss functions. FIG. 19D shows the performance of the network evaluated in terms of relative $l_2$, where optimization is performed using $l_1$, relative $l_1$, $l_2$, relative $l_2$, and SSIM loss functions. FIG. 19E shows the performance of the network evaluated in terms of SSIM, where optimization is performed using $l_1$, relative $l_1$, $l_2$, relative $l_2$, and SSIM loss functions.

As illustrated in FIGS. 19A-19E, the network trained with the $l_1$ metric consistently has lower error across all five metrics. Due to this robustness, the $l_1$ error metric may be the preferred loss function for some embodiments.

It is interesting to note that sometimes the network optimized on a given error is not always the best performing one. For example, the network trained on $l_1$ error performs better on $l_2$ than the network optimized on $l_2$. One possible reason for this is that $l_2$ may be sensitive to outliers, such as fireflies, or extremely bright specular highlights that significantly contribute to the error. Trying to compensate for these regions may sacrifice performance elsewhere, while networks trained on different losses can be more robust to outliers.

b) Comparison of Direct Prediction Convolutional Network (DPCN) and Kernel Prediction Convolutional Network (KPCN)

Figure 20A:
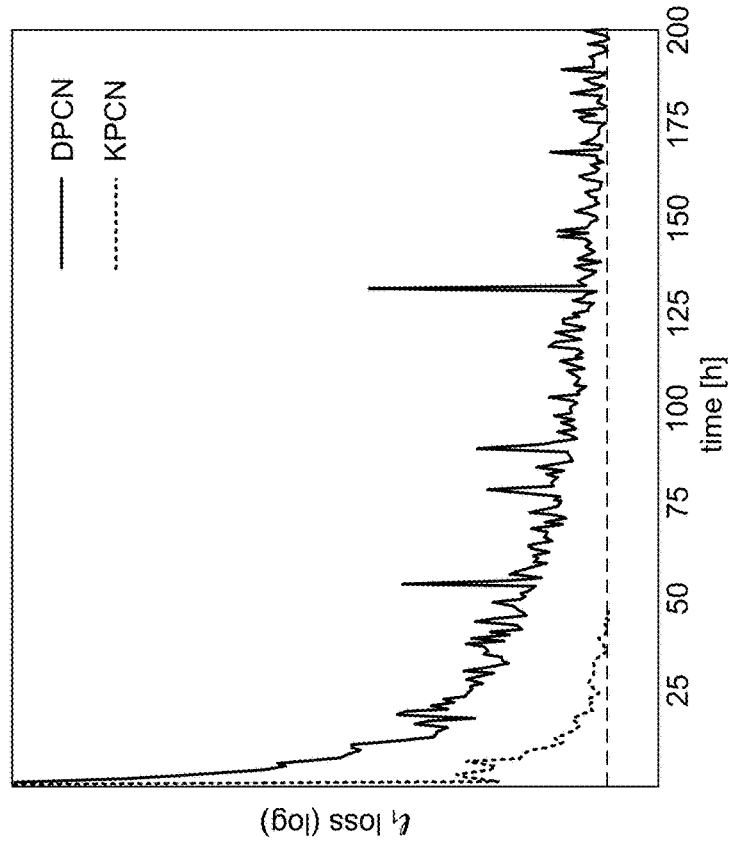
FIG. 20A compares the validation loss between the direct-prediction convolutional network (DPCN) method and the kernel-prediction convolutional network (KPCN) method as a function of hours trained for the diffuse network according to some embodiments of the present invention.
Figure 20B:
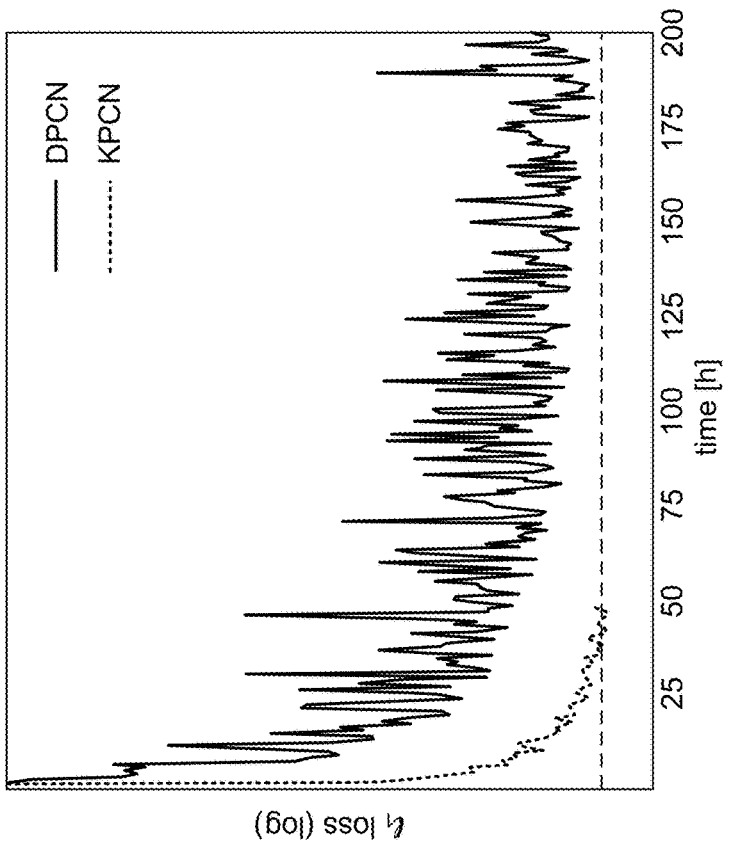
FIG. 20B compares the validation loss between the direct-prediction convolutional network (DPCN) method and the kernel-prediction convolutional network (KPCN) method as a function of hours trained for the specular network according to some embodiments of the present invention.

FIG. 20A compares the validation loss between the DPCN and KPCN reconstruction methods as a function of hours trained for the diffuse network. FIG. 20B compares the validation loss between the DPCN and KPCN reconstruction methods as a function of hours trained for the specular network. For the KPCN reconstruction method, training is stopped after 50 hours. The average loss during the last 10% of training is shown with the horizontal, dashed line. As illustrated, the convergence of the DPCN is slower with considerably higher variance. On average, DPCN may require 5-6 times longer to reach the same loss value. Therefore, using the KPCN reconstruction method can greatly speed up training without sacrificing average performance.

c) Effects of Decomposition and Including Additional Features

Figure 21A:
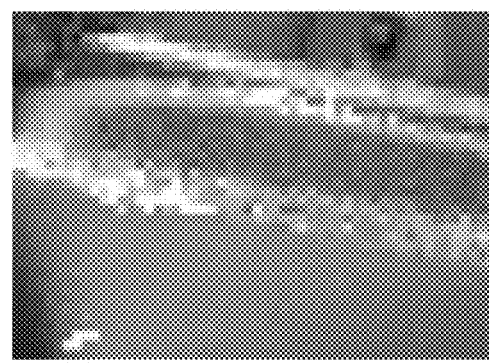
FIGS. 21A-21D show an input image (rendered with 32 spp), a corresponding denoised image using a neural network trained on the raw color buffer (without decomposition of diffuse and specular components or the albedo divide) and by directly outputting the denoised color, a corresponding denoised image using processed color buffer as input with decomposition and albedo divide, and a reference image (rendered with 1K spp), respectively, for an exemplary scene according to some embodiments of the present invention.
Figure 21B:
Figure 21C:
Figure 21D:

In some embodiments, the effects of the various additions to the denoising framework disclosed herein are evaluated. FIGS. 21A-21D show an input image (rendered with 32 spp), a corresponding denoised image using a neural network trained on the raw color buffer (without decomposition of diffuse and specular components or the albedo divide) and by directly outputting the denoised color, a corresponding denoised image using processed color buffer as input with decomposition and albedo divide, and a reference image (rendered with 1K spp), respectively, for an exemplary scene according to some embodiments of the present invention. As illustrated in FIG. 21B, because the input and output may have high dynamic range, a network trained on the raw color buffer may not be able to properly handle bright regions and may cause ringing and color artifacts around highlights, which can be prevented in the network trained on processed buffer as illustrated in FIG. 21C.

Figure 22A:
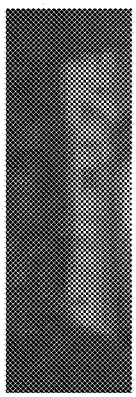
FIGS. 22A-22D show an input image (rendered with 32 spp), a corresponding denoised image using unprocessed color buffer as input without decomposition or the albedo divide, a corresponding denoised image using processed color buffer as input with decomposition and albedo divide, and a reference image (rendered with 1K spp), respectively, for another exemplary scene according to some embodiments of the present invention.
Figure 22B:
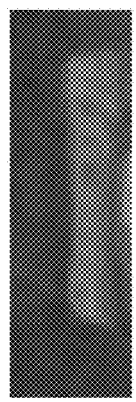
Figure 22C:
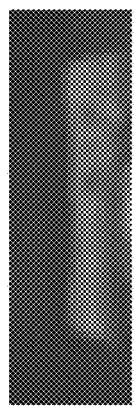
Figure 22D:
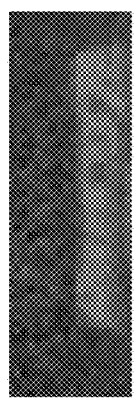

FIGS. 22A-22D show an input image (rendered with 32 spp), a corresponding denoised image using unprocessed color buffer as input without decomposition or the albedo divide, a corresponding denoised image using processed color buffer as input with decomposition and albedo divide, and a reference image (rendered with 1K spp), respectively, for another exemplary scene according to some embodiments of the present invention. As illustrated in FIG. 22B, because it has no features/information to allow it to distinguish between scene noise and detail, a network trained on the raw color buffer may produce overblurred results and miss some features, which can be prevented in the network trained on processed buffer as illustrated in FIG. 22C. In addition, working in the HDR domain may cause instability in the network weights making it difficult to train properly.

FIGS. 23A-23D show an input image (rendered with 32 spp), a corresponding output image denoised without using additional features, a corresponding output image denoised using additional features (e.g., shading normal, depth, albedo), and a reference image (rendered with 2K spp), respectively, for another exemplary scene according to some embodiments of the present invention. One advantage of denoising rendered images using deep networks over denoising photographs is that additional information output by the rendering system, including shading normals, depth, and albedo, may be utilized in the denoising process. As illustrated in FIG. 23B, the network trained only on the color buffer without additional features may overblur details as it may not be able to differentiate between scene detail and noise, whereas the network trained using additional features may avoid such undesirable effects as illustrated in FIG. 23C.

Figure 24D:
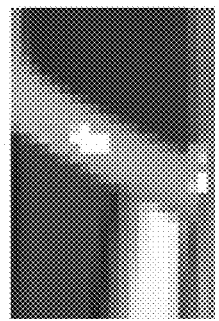
FIGS. 24A-24D show an input image (rendered with 32 spp), a corresponding output image denoised without logarithmic transformation to the specular component of the input, a corresponding output image denoised with logarithmic transformation to the specular component of the input, and a reference image (rendered with 2K spp), respectively, for another exemplary scene according to some embodiments of the present invention.
Figure 24C:
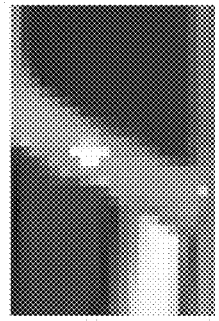
Figure 24B:
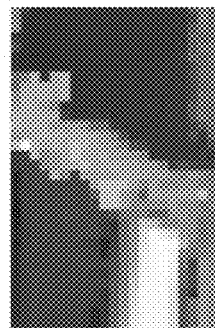
Figure 24A:
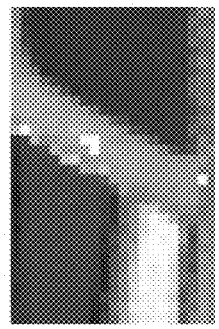

FIGS. 24A-24D show an input image (rendered with 32 spp), a corresponding output image denoised without logarithmic transformation to the specular component of the input, a corresponding output image denoised with logarithmic transformation to the specular component of the input, and a reference image (rendered with 2K spp), respectively, for another exemplary scene according to some embodiments of the present invention. Training with high dynamic range data may introduce many issues. For example, the wide range of values for both the inputs and outputs may create instability in the weights and can make training difficult, as illustrated in FIG. 24B. As illustrated in FIG. 24C, using the log transform of the color buffer and its corresponding transformed variance may reduce artifacts in bright regions. In addition, it is found that working in the log domain had benefits for previous denoising techniques as well. For example, it may reduce halos and ringing issues.

FIGS. 25A-25F show (A) an input image (rendered with 32 spp), (B) a corresponding output image denoised without decomposition of the input and albedo divide, (C) a corresponding output image denoised with decomposition of the input but without albedo divide, (D) a corresponding output image denoised without decomposition of the input but with albedo divide, (E) a corresponding output image denoised with decomposition of the input and albedo divide, and (F) a reference image (rendered with 2K spp), respectively, for another exemplary scene according to some embodiments of the present invention. As illustrated in FIGS. 25A-25F, both the diffuse/specular decomposition and albedo factorization can improve the denoising performance significantly. The decomposition may allow the networks to separately handle the fundamentally different diffuse and specular noise. Furthermore, by dividing out the albedo from the diffuse illumination and thereby denoising the effective irradiance, texture details may be preserved more easily. For instance, overblurring may be observed when the system is trained without albedo divide. As an example, as illustrated in FIGS. 25B and 25C, the decals on a car may become overblurred and illegible without the albedo divide. Moreover, if the albedo divide is performed without the decomposition, the network may preserve details but can have clear artifacts in specular regions.

V. EXAMPLE SYSTEMS

Figure 26:
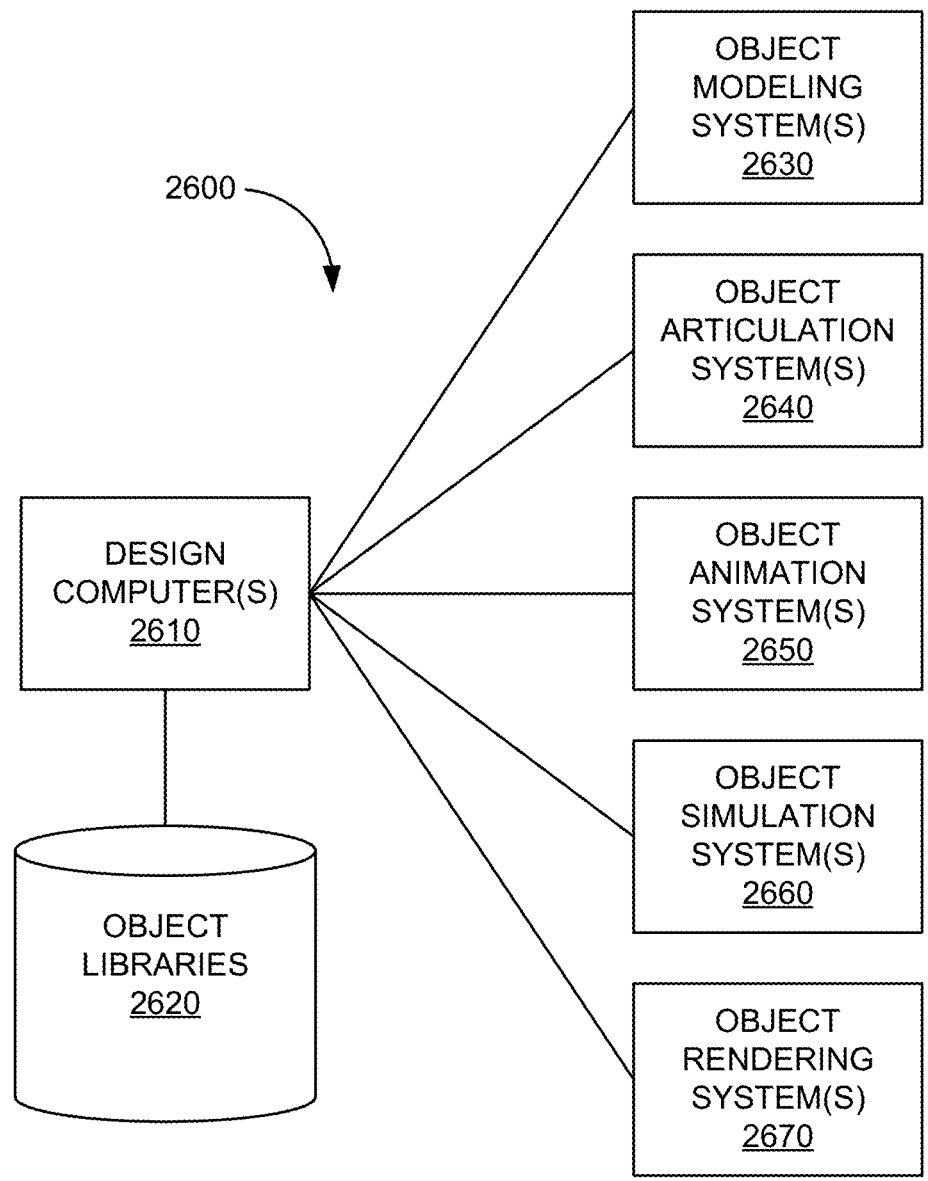
FIG. 26 is a simplified block diagram of system 2600 for creating computer graphics imagery (CGI) and computer-aided animation that may implement or incorporate various embodiments.

FIG. 26 is a simplified block diagram of system 2600 for creating computer graphics imagery (CGI) and computer-aided animation that may implement or incorporate various embodiments. In this example, system 2600 can include one or more design computers 2610, object library 2620, one or more object modeler systems 2630, one or more object articulation systems 2640, one or more object animation systems 2650, one or more object simulation systems 2660, and one or more object rendering systems 2670. Any of the systems 2630-2670 may be invoked by or used directly by a user of the one or more design computers 2610 and/or automatically invoked by or used by one or more processes associated with the one or more design computers 2610. Any of the elements of system 2600 can include hardware and/or software elements configured for specific functions.

The one or more design computers 2610 can include hardware and software elements configured for designing CGI and assisting with computer-aided animation. Each of the one or more design computers 2610 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 2610 may be used at various stages of a production process (e.g., pre-production, designing, creating, editing, simulating, rendering, post-production, etc.) to produce images, image sequences, motion pictures, video, audio, or associated effects related to CGI and animation.

In one example, a user of the one or more design computers 2610 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 2610 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 2610 acting as an animator may employ one or more systems or tools to specify motion and position of one or more objects over time to produce an animation.

Object library 2620 can include elements configured for storing and accessing information related to objects used by the one or more design computers 2610 during the various stages of a production process to produce CGI and animation. Some examples of object library 2620 can include a file, a database, or other storage devices and mechanisms. Object library 2620 may be locally accessible to the one or more design computers 2610 or hosted by one or more external computer systems.

Some examples of information stored in object library 2620 can include an object itself, metadata, object geometry, object topology, rigging, control data, animation data, animation cues, simulation data, texture data, lighting data, shader code, or the like. An object stored in object library 2620 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 2630 can include hardware and/or software elements configured for modeling one or more objects. Modeling can include the creating, sculpting, and editing of an object. In various embodiments, the one or more object modeling systems 2630 may be configured to generate a model to include a description of the shape of an object. The one or more object modeling systems 2630 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 2630 may further generate model data (e.g., 2D and 3D model data) for use by other elements of system 2600 or that can be stored in object library 2620. The one or more object modeling systems 2630 may be configured to allow a user to associate additional information, metadata, color, lighting, rigging, controls, or the like, with all or a portion of the generated model data.

The one or more object articulation systems 2640 can include hardware and/or software elements configured to articulating one or more computer-generated objects. Articulation can include the building or creation of rigs, the rigging of an object, and the editing of rigging. In various embodiments, the one or more articulation systems 2640 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 2640 may further generate articulation data (e.g., data associated with controls or animations variables) for use by other elements of system 2600 or that can be stored in object library 2620. The one or more object articulation systems 2640 may be configured to allow a user to associate additional information, metadata, color, lighting, rigging, controls, or the like, with all or a portion of the generated articulation data.

The one or more object animation systems 2650 can include hardware and/or software elements configured for animating one or more computer-generated objects. Animation can include the specification of motion and position of an object over time. The one or more object animation systems 2650 may be invoked by or used directly by a user of the one or more design computers 2610 and/or automatically invoked by or used by one or more processes associated with the one or more design computers 2610.

In various embodiments, the one or more animation systems 2650 may be configured to enable users to manipulate controls or animation variables or utilized character rigging to specify one or more key frames of animation sequence. The one or more animation systems 2650 generate intermediary frames based on the one or more key frames. In some embodiments, the one or more animation systems 2650 may be configured to enable users to specify animation cues, paths, or the like according to one or more predefined sequences. The one or more animation systems 2650 generate frames of the animation based on the animation cues or paths. In further embodiments, the one or more animation systems 2650 may be configured to enable users to define animations using one or more animation languages, morphs, deformations, or the like.

The one or more object animation systems 2650 may further generate animation data (e.g., inputs associated with controls or animation variables) for use by other elements of system 2600 or that can be stored in object library 2620. The one or more object animation systems 2650 may be configured to allow a user to associate additional information, metadata, color, lighting, rigging, controls, or the like, with all or a portion of the generated animation data.

The one or more object simulation systems 2660 can include hardware and/or software elements configured for simulating one or more computer-generated objects. Simulation can include determining motion and position of an object over time in response to one or more simulated forces or conditions. The one or more object simulation systems 2660 may be invoked by or used directly by a user of the one or more design computers 2610 and/or automatically invoked by or used by one or more processes associated with the one or more design computers 2610.

In various embodiments, the one or more object simulation systems 2660 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 2660 may be used to simulate the behavior of objects, such as hair, fur, and cloth, in response to a physics model and/or animation of one or more characters and objects within a computer-generated scene.

The one or more object simulation systems 2660 may further generate simulation data (e.g., motion and position of an object over time) for use by other elements of system 2600 or that can be stored in object library 2620. The generated simulation data may be combined with or used in addition to animation data generated by the one or more object animation systems 2650. The one or more object simulation systems 2660 may be configured to allow a user to associate additional information, metadata, color, lighting, rigging, controls, or the like, with all or a portion of the generated simulation data.

The one or more object rendering systems 2670 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 2670 may be invoked by or used directly by a user of the one or more design computers 2610 and/or automatically invoked by or used by one or more processes associated with the one or more design computers 2610. One example of a software program embodied as the one or more object rendering systems 2670 can include PhotoRealistic RenderMan, or PRMan, produced by Pixar Animation Studios of Emeryville, Calif.

In various embodiments, the one or more object rendering systems 2670 can be configured to render one or more objects to produce one or more computer-generated images or a set of images over time that provide an animation. The one or more object rendering systems 2670 may generate digital images or raster graphics images.

In various embodiments, a rendered image can be understood in terms of a number of visible features. Some examples of visible features that may be considered by the one or more object rendering systems 2670 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fog/participating medium (e.g., techniques relating to how light dims when passing through non-clear atmosphere or air), shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind a focal plane), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 2670 may further render images (e.g., motion and position of an object over time) for use by other elements of system 2600 or that can be stored in object library 2620. The one or more object rendering systems 2670 may be configured to allow a user to associate additional information or metadata with all or a portion of the rendered image.

Figure 27:
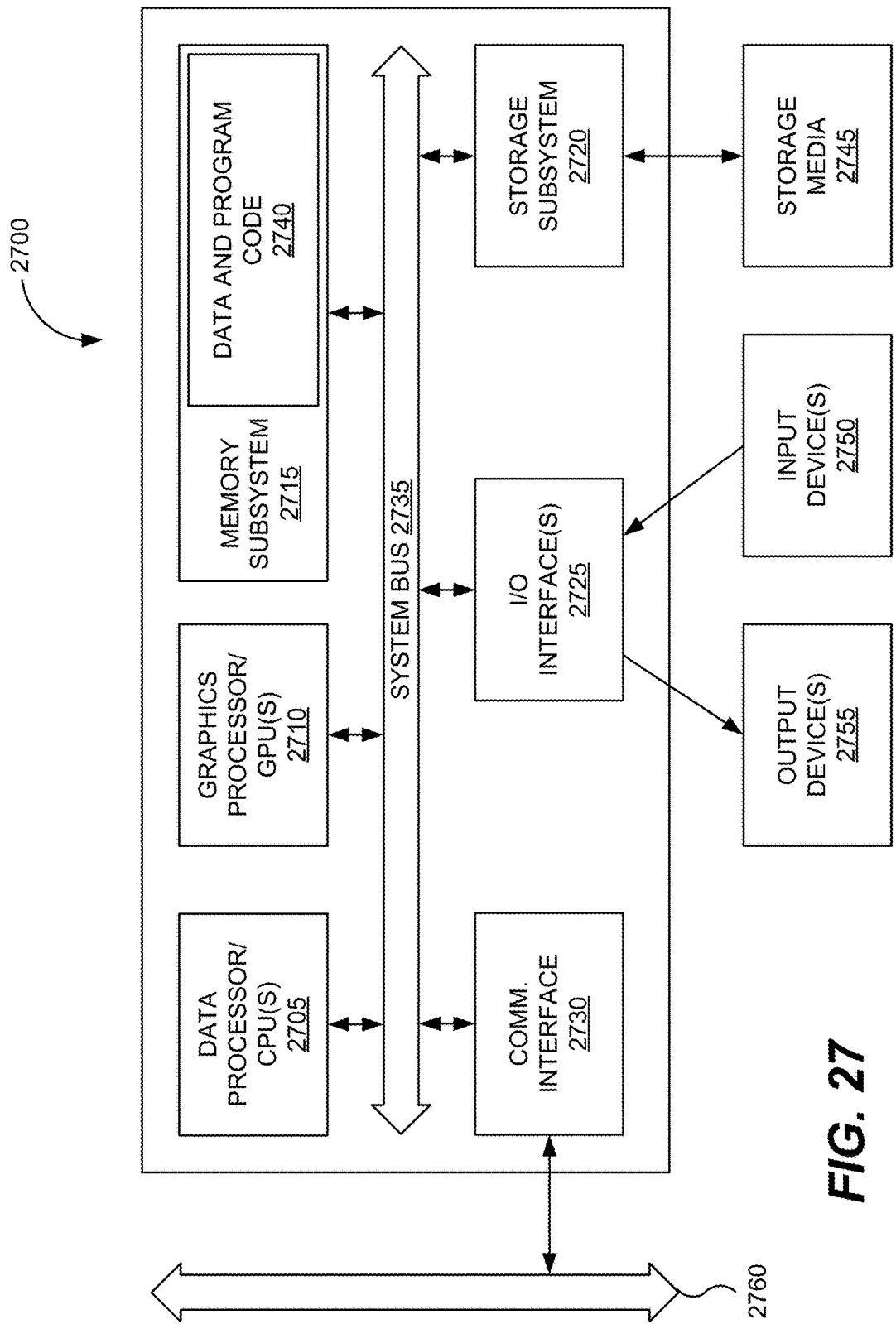
FIG. 27 is a block diagram of a computer system according to some embodiments.

FIG. 27 is a block diagram of computer system 2700. FIG. 27 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 2700 and any of its components or subsystems can include hardware and/or software elements configured for performing methods described herein.

Computer system 2700 may include familiar computer components, such as one or more data processors or central processing units (CPUs) 2705, one or more graphics processors or graphical processing units (GPUs) 2710, memory subsystem 2715, storage subsystem 2720, one or more input/output (I/O) interfaces 2725, communications interface 2730, or the like. Computer system 2700 can include system bus 2735 interconnecting the above components and providing functionality, such connectivity as inter-device communication.

The one or more data processors or central processing units (CPUs) 2705 can execute logic or program code or for providing application-specific functionality. Some examples of CPU(s) 2705 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 2710 can execute logic or program code associated with graphics or for providing graphics-specific functionality. GPUs 2710 may include any conventional graphics processing unit, such as those provided by conventional video cards. In various embodiments, GPUs 2710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 2710 may include any number of registers, logic units, arithmetic units, caches, memory interfaces, or the like.

Memory subsystem 2715 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 2715 can include data and program code 2740.

Storage subsystem 2720 can also store information using machine-readable articles, information storage devices, or computer-readable storage media. Storage subsystem 2720 may store information using storage media 2745. Some examples of storage media 2745 used by storage subsystem 2720 can include floppy disks, hard disks, optical storage media such as CD-ROMS, DVDs and bar codes, removable storage devices, networked storage devices, or the like. In some embodiments, all or part of data and program code 2740 may be stored using storage subsystem 2720.

The one or more input/output (I/O) interfaces 2725 can perform I/O operations. One or more input devices 2750 and/or one or more output devices 2755 may be communicatively coupled to the one or more I/O interfaces 2725. The one or more input devices 2750 can receive information from one or more sources for computer system 2700. Some examples of the one or more input devices 2750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 2750 may allow a user of computer system 2700 to interact with one or more non-graphical or graphical user interfaces to enter a comment, select objects, icons, text, user interface widgets, or other user interface elements that appear on a monitor/display device via a command, a click of a button, or the like.

The one or more output devices 2755 can output information to one or more destinations for computer system 2700. Some examples of the one or more output devices 2755 can include a printer, a fax, a feedback device for a mouse or joystick, external storage systems, a monitor or other display device, a communications interface appropriately configured as a transceiver, or the like. The one or more output devices 2755 may allow a user of computer system 2700 to view objects, icons, text, user interface widgets, or other user interface elements. A display device or monitor may be used with computer system 2700 and can include hardware and/or software elements configured for displaying information.

Communications interface 2730 can perform communications operations, including sending and receiving data. Some examples of communications interface 2730 may include a network communications interface (e.g. Ethernet, Wi-Fi, etc.). For example, communications interface 2730 may be coupled to communications network/external bus 2760, such as a computer network, a USB hub, or the like. A computer system can include multiple of the same components or subsystems, e.g., connected together by communications interface 2730 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 2700 may also include one or more applications (e.g., software components or functions) to be executed by a processor to execute, perform, or otherwise implement techniques disclosed herein. These applications may be embodied as data and program code 2740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 2715 and/or storage subsystem 2720.

Such programs may also be encoded and transmitted using carrier signals adapted for transmission via wired, optical, and/or wireless networks conforming to a variety of protocols, including the Internet. As such, a computer readable medium according to examples described herein may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of this disclosure. However, other embodiments of the disclosure herein may be directed to specific embodiments relating to each individual aspect, or specific combinations of these individual aspects.

The above description of exemplary embodiments of this disclosure have been presented for the purposes of illustration and description. It is not intended to be exhaustive or to limit this disclosure to the precise form described, and many modifications and variations are possible in light of the teaching above. The embodiments were chosen and described in order to best explain the principles of this disclosure and its practical applications to thereby enable others skilled in the art to best utilize this disclosure in various embodiments and with various modifications as are suited to the particular use contemplated.

A recitation of "a," "an" or "the" is intended to mean "one or more" unless specifically indicated to the contrary.

All patents, patent applications, publications, and descriptions mentioned here are incorporated by reference in their entirety for all purposes. None is admitted to be prior art.

VI. REFERENCES

Martin Abadi, Ashish Agarwal, Paul Barham, and others. 2015. TensorFlow: Large-Scale Machine Learning on Heterogeneous Systems. (2015). http://tensor_ow.org/ Software available from tensor_ow.org.

David Balduzzi, Brian McWilliams, and Tony Butler-Yeoman. 2016. Neural Taylor Approximations: Convergence and Exploration in Recti_er Networks. arXiv preprint arXiv:1611.02345 (2016).

Pablo Bauszat, Martin Eisemann, and Marcus Magnor. 2011. Guided Image Filtering for Interactive High-quality Global Illumination. Computer Graphics Forum 30, 4 (2011), 1361-1368.

Benedikt Bitterli. 2016. Rendering Resources. (2016). https://benediktbitterli.me/resources/.

Benedikt Bitterli, Fabrice Rousselle, Bochang Moon, José A. Iglesias-Guitián, David Adler, Kenny Mitchell, Wojciech Jarosz, and Jan Novák. 2016. Nonlinearly Weighted First-order Regression for Denoising Monte Carlo Renderings. Computer Graphics Forum 35, 4 (2016), 107-117.

Antoni Buades, Bartomeu Coll, and Jean-Michel Morel. 2005. A Review of Image Denoising Algorithms, with a New One. Multiscale Modeling & Simulation 4, 2 (2005), 490-530.

H. C. Burger, C. J. Schuler, and S. Harmeling. 2012. Image Denoising: Can Plain Neural Networks Compete with BM3D?. In 2012 IEEE Conference on Computer Vision and Pattern Recognition. 2392-2399.

Chakravarty R. A. Chaitanya, Anton Kaplanyan, Christoph Schied, Marco Salvi, Aaron Lefohn, Derek Nowrouzezahrai, and Timo Aila. 2017. Interactive Reconstruction of Noisy Monte Carlo Image Sequences using a Recurrent Autoencoder. ACM Trans. Graph. (Proc. SIGGRAPH) (2017).

Robert L. Cook, Loren Carpenter, and Edwin Catmull. 1987. The Reyes Image Rendering Architecture. SIGGRAPH Comput. Graph. 21, 4 (Aug. 1987), 95-102.

Kostadin Dabov, Alessandro Foi, Vladimir Katkovnik, and Karen Egiazarian. 2006. Image Denoising with Block-Matching and 3D Filtering. (2006).

Jerome Friedman, Trevor Hastie, and Robert Tibshirani. 2001. The Elements of Statistical Learning. Vol. 1. Springer series in statistics Springer, Berlin.

Michael Gharbi, Gaurav Chaurasia, Sylvain Paris, and Frédo Durand. 2016. Deep Joint Demosaicking and Denoising. ACM Trans. Graph. 35, 6, Article 191 (Nov. 2016), 12 pages.

Xavier Glorot and Yoshua Bengio. 2010. Understanding the Di_culty of Training Deep Feedforward Neural Networks. In International conference on arti_cial intelligence and statistics. 249-256.

Luke Goddard. 2014. Silencing the Noise on Elysium. In ACM SIGGRAPH 2014 Talks (SIGGRAPH '14). ACM, New York, N.Y., USA, Article 38, 1 pages.

Kaiming He, Xiangyu Zhang, Shaoqing Ren, and Jian Sun. 2016. Deep Residual Learning for Image Recognition. In IEEE Conference on Computer Vision and Pattern Recognition (CVPR). http://arxiv.org/abs/1512.03385

James T. Kajiya. 1986. The Rendering Equation. SIGGRAPH Comput. Graph. 20, 4 (Aug. 1986), 143-150.

Nima Khademi Kalantari, Steve Bako, and Pradeep Sen. 2015. A Machine Learning Approach for Filtering Monte Carlo Noise. 34, 4, Article 122 (July 2015), 12 pages.

Nima Khademi Kalantari and Pradeep Sen. 2013. Removing the Noise in Monte Carlo Rendering with General Image Denoising Algorithms. 32, 2pt1 (2013), 93-102.

A. Keller, L. Fascione, M. Fajardo, I. Georgiev, P. Christensen, J. Hanika, C. Eisenacher, and G. Nichols. 2015. The Path Tracing Revolution in the Movie Industry. In ACM SIGGRAPH 2015 Courses (SIGGRAPH '15). ACM, New York, N.Y., USA, Article 24, 7 pages.

Diederik P. Kingma and Jimmy Ba. 2014. Adam: A Method for Stochastic Optimization. CoRR abs/1412.6980 (2014). http://arxiv.org/abs/1412.6980

Diederik P Kingma and Max Welling. 2013. Auto-Encoding Variational Bayes. In International Conference on Learning Representations.

Yann LeCun, Yoshua Bengio, and Geo_rey Hinton. 2015. Deep Learning. Nature 521 (2015), 436-444.

Christian Ledig, Lucas Theis, Ferenc Huszár, Jose Caballero, Andrew Cunningham, Alejandro Acosta, Andrew Aitken, Alykhan Tejani, Johannes Totz, Zehan Wang, and others. 2016. Photo-Realistic Single Image Super-Resolution using a Generative Adversarial Network. arXiv preprint arXiv:1609.04802 (2016).

Tzu-Mao Li, Yu-Ting Wu, and Yung-Yu Chuang. 2012. SURE-based Optimization for Adaptive Sampling and Reconstruction. ACM Trans. Graph. 31, 6, Article 194 (Nov. 2012), 9 pages.

Michael D. McCool. 1999. Anisotropic Di_usion for Monte Carlo Noise Reduction. ACM Transactions on Graphics 18, 2 (April 1999), 171-194.

Bochang Moon, Nathan Carr, and Sung-Eui Yoon. 2014. Adaptive Rendering Based on Weighted Local Regression. ACM Trans. Graph. 33, 5 (September 2014), 170: 1-170:14.

Bochang Moon, Jong Yun Jun, JongHyeob Lee, Kunho Kim, Toshiya Hachisuka, and Sung-Eui Yoon. 2013. Robust Image Denoising Using a Virtual Flash Image for Monte Carlo Ray Tracing. Computer Graphics Forum 32, 1 (2013), 139-151.

Bochang Moon, Steven McDonagh, Kenny Mitchell, and Markus Gross. 2016. Adaptive Polynomial Rendering. To appear in ACM Trans. Graph. (Proc. SIGGRAPH) (2016), 10.

Aaron van den Oord, Sander Dieleman, Heiga Zen, Karen Simonyan, Oriol Vinyals, Alex Graves, Nal Kalchbrenner, Andrew Senior, and Koray Kavukcuoglu. 2016. Wavenet: A Generative Model for Raw Audio. arXiv preprint arXiv: 1609.03499 (2016).

Fabrice Rousselle, Claude Knaus, and Matthias Zwicker. 2011. Adaptive Sampling and Reconstruction using Greedy Error Minimization. ACM Trans. Graph. 30, 6, Article 159 (Dec. 2011), 12 pages.

Fabrice Rousselle, Claude Knaus, and Matthias Zwicker. 2012. Adaptive Rendering with Non-local Means Filtering. 31, 6, Article 195 (Nov. 2012), 11 pages.

Fabrice Rousselle, Marco Manzi, and Matthias Zwicker. 2013. Robust Denoising using Feature and Color Information. Computer Graphics Forum 32, 7 (2013), 121-130.

Holly E. Rushmeier and Gregory J. Ward. 1994. Energy Preserving Non-Linear Filters. In Proc. 21st annual Conf.

on Computer graphics and interactive techniques (SIG-GRAPH '94). ACM, 131-138.

Tim Salimans and Diederik P Kingma. 2016. Weight Normalization: A Simple Reparameterization to Accelerate Training of Deep Neural Networks. In Adv in Neural Information Processing Systems (NIPS).

Pradeep Sen and Soheil Darabi. 2012. On Filtering the Noise from the Random Parameters in Monte Carlo Rendering. ACM Transactions on Graphics 31, 3, Article 18 (June 2012), 15 pages.

Pradeep Sen, Matthias Zwicker, Fabrice Rousselle, Sung-Eui Yoon, and Nima Khademi Kalantari. 2015. Denoising Your Monte Carlo Renders: Recent Advances in Imagespace Adaptive Sampling and Reconstruction. In ACM SIGGRAPH 2015 Courses. ACM, 11.

Karen Simonyan and Andrew Zisserman. 2014. Very Deep Convolutional Networks for Large-Scale Image Recognition. arXiv preprint arXiv:1409.1556 (2014).

Charles M. Stein. 1981. Estimation of the Mean of a Multivariate Normal Distribution. The Annals of Statistics 9, 6 (1981), 1135-1151. http://www.jstor.org/stable/2240405

Zhou Wang, A. C. Bovik, H. R. Sheikh, and E. P. Simoncelli. 2004. Image Quality Assessment: from Error Visibility to Structural Similarity. IEEE Transactions on Image Processing 13, 4 (April 2004), 600-612.

Junyuan Xie, Linli Xu, and Enhong Chen. 2012. Image Denoising and Inpainting with Deep Neural Networks. In Advances in Neural Information Processing Systems. 341-349.

Wenhan Yang, Jiashi Feng, Jianchao Yang, Fang Zhao, having Liu, Zongming Guo, and Shuicheng Yan. 2016. Deep Edge Guided Recurrent Residual Learning for Image Super-Resolution. CoRR abs/1604.08671 (2016). http://arxiv.org/abs/1604.08671

Kai Zhang, Wangmeng Zuo, Yunjin Chen, Deyu Meng, and Lei Zhang. 2016. Beyond a Gaussian Denoiser: Residual Learning of Deep CNN for Image Denoising. arXiv preprint arXiv:1608.03981 (2016).

Henning Zimmer, Fabrice Rousselle, Wenzel Jakob, Oliver-Wang, David Adler, Wojciech Jarosz, Olga Sorkine-Hornung, and Alexander Sorkine-Hornung. 2015. Path-space Motion Estimation and Decomposition for Robust Animation Filtering. Computer Graphics Forum 34, 4 (2015), 131-142.

Matthias Zwicker, Wojciech Jarosz, Jaakko Lehtinen, Bochang Moon, Ravi Ramamoorthi, Fabrice Rousselle, Pradeep Sen, Cyril Soler, and Sung-Eui Yoon. 2015. Recent Advances in Adaptive Sampling and Reconstruction for Monte Carlo Rendering. 34, 2 (May 2015), 667-681.

What is claimed is:

1. A method of denoising images rendered by Monte Carlo (MC) path-tracing, the method comprising:
   receiving a plurality of input images, each input image having a first number of pixels and including input image data for each respective pixel obtained by MC path-tracing;
   receiving a plurality of reference images, each reference image corresponding to a respective input image and having a second number of pixels, each reference image including reference image data for each respective pixel;
   training a convolutional neural network (CNN) using the plurality of input images and the plurality of reference images, the CNN including:
      an input layer having a first number of input nodes for receiving input image data for each respective pixel of a respective input image;
      a plurality of hidden layers, each hidden layer having a respective number of nodes and having a respective receptive field, each respective hidden layer applying a convolution operation to a preceding hidden layer, with a first hidden layer of the plurality of hidden layers applying a convolution operation to the input layer, each node of a respective hidden layer processing data of a plurality of nodes of a preceding hidden layer within the respective receptive field using a plurality of parameters associated with the respective receptive field;
      an output layer having a second number of output nodes, the output layer applying a convolution operation to a last hidden layer of the plurality of hidden layers to obtain a plurality of output values associated with the second number of output nodes; and
      a reconstruction module coupled to the output layer for generating a respective output image corresponding to the respective input image using the plurality of output values, the respective output image having the second number of pixels and including output image data for each respective pixel;
      wherein training the CNN includes, for each respective input image, optimizing the plurality of parameters associated with the respective receptive field of each hidden layer by comparing the respective output image to a corresponding reference image to obtain a plurality of optimized parameters;
   receiving a new input image obtained by MC path-tracing; and
   generating a new output image corresponding to the new input image by passing the new input image through the CNN using the plurality of optimized parameters, the new output image being less noisy than the new input image.

2. The method of claim 1, wherein the input image data for each respective pixel of a respective input image comprises intensity data.

3. The method of claim 2, wherein the input image data for each respective pixel of a respective input image further comprises color data for red, green, and blue colors.

4. The method of claim 3, wherein the input image data for each respective pixel of a respective input image further comprises one or more of albedo data, surface normal data, and depth data.

5. The method of claim 4, wherein the input image data for each respective pixel of a respective input image further comprises one or more of variance data for the intensity data, variance data for the color data, variance data for the albedo data, variance data for the surface normal data, and variance data for the depth data.

6. The method of claim 3, wherein the input image data for each respective pixel of a respective input image further comprises one or more of object identifiers, visibility data, and bidirectional reflectance distribution function (BRDF) data.

7. The method of claim 1, wherein each input image is rendered by MC path-tracing for a scene with a first number of samples per pixel, and each corresponding reference image is rendered by MC path tracing for the scene with a second number of samples per pixel greater than the first number of samples per pixel.

8. The method of claim 1, wherein each output value comprises color data for a respective pixel of the output image.

9. The method of claim 1, wherein:
the second number of output nodes of the output layer is associated with a neighborhood of pixels around each pixel of a respective input image;
the input image data for each respective pixel of the respective input image comprises color data for the respective pixel; and
the output image data for each respective pixel of the output image comprises color data for each respective pixel of the output image generated by the reconstruction module as a weighted combination of the color data for the neighborhood of pixels around a corresponding pixel of the input image using the plurality of output values associated with the second number of output nodes as weights.

10. The method of claim 9, wherein the plurality of output values is normalized.

11. The method of claim 1, further comprising normalizing the input image data for the first number of pixels of the input image.

12. A method of denoising images rendered by Monte Carlo (MC) path-tracing, the method comprising:
receiving a plurality of input images, each input image having a first number of pixels and including input image data for each respective pixel obtained by MC path-tracing, the input image data comprising color data for each respective pixel;
receiving a plurality of reference images, each reference image corresponding to a respective input image and having a second number of pixels, each reference image including reference image data for each respective pixel;
training a neural network using the plurality of input images and the plurality of reference images, the neural network including:
an input layer having a first number of input nodes for receiving input image data for each respective pixel of a respective input image;
a plurality of hidden layers, each hidden layer having a respective number of nodes, each node of a respective hidden layer processing data of a plurality of nodes of a preceding hidden layer using a plurality of parameters associated with the plurality of nodes, with each node of a first hidden layer of the plurality of hidden layers processing data of a plurality of nodes of the input layer;
an output layer having a second number of output nodes associated with a neighborhood of pixels around each pixel of the input image, each node of the output layer processing data of a plurality of nodes of a last hidden layer of the plurality of hidden layers to obtain a respective output value; and
a reconstruction module coupled to the output layer for generating a respective output image corresponding to the respective input image, the respective output image having the second number of pixels, each respective pixel having color data relating to a weighted combination of the color data for the neighborhood of pixels around a corresponding pixel of the input image using the output values associated with the second number of output nodes as weights;
wherein training the neural network includes, for each respective input image, optimizing the plurality of parameters associated with the plurality of nodes of each hidden layer by comparing the respective output image to a corresponding reference image to obtain a plurality of optimized parameters;
receiving a new input image obtained by MC path-tracing; and
generating a new output image corresponding to the new input image by passing the new input image through the neural network using the plurality of optimized parameters, the new output image being less noisy than the new input image.

13. The method of claim 12, wherein the neural network comprises a convolutional neural network (CNN).

14. The method of claim 12, wherein the neural network comprises a multilayer perception (MLP) neural network.

15. The method of claim 12, wherein the input image data for each respective pixel of a respective input image further comprises one or more of albedo data, surface normal data, depth data, variances of color data, variances of albedo data, variances of surface normal data, and variances of depth data.

16. The method of claim 12, wherein each input image is rendered by MC path-tracing for a scene with a first number of samples per pixel, and each corresponding reference image is rendered by MC path tracing for the scene with a second number of samples per pixel greater than the first number of samples per pixel.

17. The method of claim 12, wherein the output values associated with the second number of output nodes of the output layer is normalized.

18. The method of claim 12, further comprising normalizing the input image data for the first number of pixels of the input image.

19. A method of denoising images rendered by Monte Carlo (MC) path-tracing, the method comprising:
receiving a plurality of input images, each input image having a first number of pixels and including a diffuse buffer and a specular buffer, the diffuse buffer including diffuse input image data for each respective pixel, the specular buffer including specular input image data for each respective pixel, the diffuse input image data comprising diffuse color data for each respective pixel, and the specular input image data comprising specular color data for each respective pixel;
receiving a plurality of reference images, each reference image corresponding to a respective input image and having a second number of pixels, each reference image including a diffuse buffer and a specular buffer, the diffuse buffer including diffuse reference image data for each respective pixel, the specular buffer including specular reference image data for each respective pixel;
training a first neural network using the diffuse buffers of the plurality of input images and the diffuse buffers of the plurality of reference images, the first neural network including:
a diffuse input layer for receiving diffuse input image data for each respective pixel of a respective input image;
a plurality of diffuse hidden layers, each diffuse hidden layer including a plurality of nodes, each node of a respective diffuse hidden layer processing data of a plurality of nodes of a preceding diffuse hidden layer using a plurality of first parameters associated with the plurality of nodes, with each node of a first diffuse hidden layer of the plurality of diffuse hidden layers processing data of a plurality of nodes of the diffuse input layer;

a diffuse output layer having a first number of output nodes associated with a first neighborhood of pixels around each pixel of the input image, each node of the diffuse output layer processing data of a plurality of nodes of a last diffuse hidden layer of the plurality of hidden layers to obtain a respective diffuse output value; and a diffuse reconstruction module coupled to the diffuse output layer for generating a respective diffuse output image corresponding to the respective input image, the respective diffuse output image having the second number of pixels, each respective pixel having diffuse color data relating to a weighted combination of the diffuse color data for the first neighborhood of pixels around a corresponding pixel of the input image using the diffuse output values associated with the first number of output nodes as weights;

wherein training the first neural network includes, for each respective input image, optimizing the plurality of first parameters associated with the plurality of nodes of each diffuse hidden layer by comparing the respective diffuse output image to the diffuse buffer of a corresponding reference image to obtain a plurality of optimized first parameters;

training a second neural network using the specular buffers of the plurality of input images and the specular buffers of the plurality of reference images, the second neural network including:

a specular input layer for receiving specular input image data for each respective pixel of a respective input image;

a plurality of specular hidden layers, each specular hidden layer including a plurality of nodes, each node of a respective specular hidden layer processing data of a plurality of nodes of a preceding specular hidden layer using a plurality of second parameters associated with the plurality of nodes, with each node of a first specular hidden layer of the plurality of specular hidden layers processing data of a plurality of nodes of the specular input layer;

a specular output layer having a second number of output nodes associated with a second neighborhood of pixels around each pixel of the input image, each node of the specular output layer processing data of a plurality of nodes of a last specular hidden layer of the plurality of specular hidden layers to obtain a respective specular output value; and a specular reconstruction module coupled to the specular output layer for generating a respective specular output image corresponding to the respective input image, the respective specular output image having the second number of pixels, each respective pixel having specular color data relating to a weighted combination of the specular color data for the second neighborhood of pixels around a corresponding pixel of the input image using the specular output values associated with the second number of output nodes as weights;

wherein training the second neural network includes, for each respective input image, optimizing the plurality of second parameters associated with the plurality of nodes of each specular hidden layer by comparing the respective specular output image to the specular buffer of a corresponding reference image to obtain a plurality of optimized second parameters;

receiving a new input image obtained by MC path-tracing, the new input image including a diffuse buffer and a specular buffer;

generating a new diffuse output image corresponding to the new input image by passing the diffuse buffer of the new input image through the first neural network using the plurality of optimized first parameters;

generating a new specular output image corresponding to the new input image by passing the specular buffer of the new input image through the second neural network using the plurality of optimized second parameters; and generating a new output image by combining the new diffuse output image and the new specular output image, the new output image being less noisy than the new input image.

20. The method of claim 19, wherein:
the diffuse input image data for each respective pixel of each respective input image includes albedo data and irradiance data;
the diffuse reference image data for each respective pixel of each respective reference image includes albedo data and irradiance data;
the diffuse buffer of the new input image includes new albedo data and new irradiance data for each respective pixel of the new input image; and
the new diffuse output image includes irradiance data for each pixel of the new diffuse output image;
the method further comprising:
prior to training the first neural network, factoring out the albedo data for each respective pixel of the diffuse buffer of each input image, and factoring out the albedo data for each respective pixel of the diffuse buffer of each reference image;
prior to generating the new diffuse output image, factoring out the new albedo data for each respective pixel of the diffuse buffer of the new input image; and
after generating the new diffuse output image, updating the new diffuse output image by multiplying the new albedo data to the irradiance data for each pixel of the new output image.

21. The method of claim 19, wherein:
the specular buffer of the new input image includes new specular input image data for each respective pixel; and
the new specular output image includes specular image data for each pixel of the new specular output image;
the method further comprising:
prior to training the second neural network, performing a logarithmic transformation of the specular input image data for each respective pixel of the specular buffer of each input image, and performing a logarithmic transformation of the specular reference image data for each respective pixel of the specular buffer of each reference image;
prior to generating the new specular output image, performing a logarithmic transformation of the new specular input image data for each respective pixel of the specular buffer of the new input image; and
after generating the new specular output image, performing an inverse logarithmic transformation of the specular image data for each pixel of the new specular output image.

* * * * *